US012304043B2

(12) United States Patent
Blumenthal et al.

(10) Patent No.: US 12,304,043 B2

(45) Date of Patent: May 20, 2025

(54) LOCKING PLIERS

(71) Applicant: Milwaukee Electric Tool Corporation, Brookfield, WI (US)

(72) Inventors: Aaron S. Blumenthal, Shorewood, WI (US); Christopher S. Hoppe, Midvale, UT (US); Jesse Marcelle, Muskego, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 9 days.

(21) Appl. No.: 18/062,352

(22) Filed: Dec. 6, 2022

(65) Prior Publication Data

US 2023/0109012 A1 Apr. 6, 2023

Related U.S. Application Data

(60) Division of application No. 16/137,970, filed on Sep. 21, 2018, now Pat. No. 11,541,514, which is a continuation of application No. PCT/US2017/023721, filed on Mar. 23, 2017.

(60) Provisional application No. 62/311,983, filed on Mar. 23, 2016.

(51) Int. Cl.
*B25B 7/12* (2006.01)
*B25B 7/18* (2006.01)

(52) U.S. Cl.
CPC ................ *B25B 7/123* (2013.01); *B25B 7/18* (2013.01)

(58) Field of Classification Search
CPC ......... B25B 5/068; B25B 5/127; B25B 7/123; B25B 7/02; B25B 7/12; B25B 7/14; B25B 7/18; B25B 7/22; B25B 7/04; B25B 5/04; B25B 5/06; B25B 5/12; B25B 5/16; B25B 13/00; B25B 13/10; B25B 13/28; B25B 13/34; B25B 13/48; B25B 13/5058; B25B 13/58; B25B 23/00
See application file for complete search history.

(56) References Cited

U.S. PATENT DOCUMENTS

| | | | |
|---|---|---|---|
| 1,125,945 | A | 1/1915 | Boling et al. |
| 1,813,038 | A | 7/1931 | Erne |
| 2,280,005 | A | 8/1940 | Petersen |
| 2,341,489 | A | 2/1944 | Tornborg |
| 2,417,013 | A | 3/1947 | Petersen |
| 2,478,728 | A | 8/1949 | Vincents |
| 2,499,201 | A | 2/1950 | Thayer |
| 2,528,814 | A | 11/1950 | Boyer |
| 2,584,353 | A | 2/1952 | Keiser |
| 2,592,803 | A | 4/1952 | Heim |
| 2,600,594 | A | 6/1952 | Williamson |

(Continued)

FOREIGN PATENT DOCUMENTS

| | | |
|---|---|---|
| CN | 2354709 | 12/1999 |
| CN | 2706278 Y | 6/2005 |

(Continued)

*Primary Examiner* — Robert J Scruggs

(74) *Attorney, Agent, or Firm* — Reinhart Boerner Van Deuren s.c.

(57) ABSTRACT

A hand tool including a first jaw, a first handle fixed to the first jaw, a second jaw, and a second handle pivotally coupled to the second jaw. The hand tool further includes a link member having a first end pivotally coupled to at least one selected from the group of the first jaw and the first handle, and a second end pivotally coupled to the second jaw.

13 Claims, 24 Drawing Sheets

(56) References Cited

U.S. PATENT DOCUMENTS

| | | | |
|---|---|---|---|
| 2,604,803 A | 7/1952 | McCann | |
| 2,608,893 A | 9/1952 | Cranner | |
| 2,747,446 A | 5/1956 | Eder | |
| RE24,465 E | 4/1958 | Waterbury | |
| 3,195,382 A | 7/1965 | Rommel et al. | |
| 3,379,079 A | 4/1968 | Cutter | |
| 3,496,808 A | 2/1970 | Schmidt | |
| 3,710,658 A | 1/1973 | Wilson | |
| 4,890,519 A | 1/1990 | Le Duc | |
| 5,022,291 A | 6/1991 | McBain | |
| 5,056,385 A | 10/1991 | Petersen | |
| 5,351,585 A | 10/1994 | Leseberg et al. | |
| 5,456,144 A | 10/1995 | Dahl et al. | |
| 5,460,065 A | 10/1995 | Balmer | |
| 5,609,080 A | 3/1997 | Flavingy | |
| 5,927,159 A | 7/1999 | Yokoyama et al. | |
| 5,964,130 A | 10/1999 | Wang | |
| 6,012,362 A | 1/2000 | Wang | |
| 6,212,978 B1 | 4/2001 | Seber et al. | |
| 6,212,979 B1 | 4/2001 | Wang | |
| 6,227,080 B1 * | 5/2001 | Grayo | B25B 7/123 81/368 |
| 6,279,431 B1 | 8/2001 | Seber et al. | |
| 6,279,433 B1 | 8/2001 | Chervenak | |
| 6,282,996 B1 * | 9/2001 | Berg | B25F 1/003 7/128 |
| 6,408,724 B1 | 6/2002 | Whiteford | |
| D462,247 S | 9/2002 | Hackman | |
| 6,450,070 B1 | 9/2002 | Winkler | |
| 6,513,248 B2 | 2/2003 | Linden | |
| 6,591,719 B1 | 7/2003 | Poole et al. | |
| 6,626,070 B2 | 9/2003 | Peperkorn et al. | |
| 6,748,829 B2 | 6/2004 | Seber et al. | |
| 6,776,072 B2 | 8/2004 | Poole et al. | |
| 6,857,342 B2 | 2/2005 | Wang | |
| 6,862,961 B2 * | 3/2005 | Winkler | B25B 7/02 81/355 |
| 6,889,579 B1 | 5/2005 | Brown | |
| 6,941,844 B2 | 9/2005 | Hile | |
| 6,973,859 B2 | 12/2005 | Noniewicz | |
| 7,086,312 B1 | 8/2006 | Tortolani | |
| 7,100,479 B2 | 9/2006 | Seber et al. | |
| 7,134,365 B2 | 11/2006 | Hile | |
| 7,143,671 B1 * | 12/2006 | Lai | B25B 15/00 81/368 |
| 7,146,887 B2 | 12/2006 | Hunter | |
| 7,216,570 B2 | 5/2007 | Seber et al. | |
| 7,348,453 B2 | 3/2008 | Rozema et al. | |
| 7,363,669 B2 | 4/2008 | Berg et al. | |
| 7,389,714 B1 | 6/2008 | Heagerty | |
| 7,434,498 B2 | 10/2008 | Johnson | |
| 7,444,907 B2 | 11/2008 | Seber et al. | |
| 7,454,999 B2 | 11/2008 | Wu | |
| 7,472,632 B2 | 1/2009 | Engvall et al. | |
| D588,890 S | 3/2009 | Picaza Ibarrondo | |
| D599,637 S | 9/2009 | Valencia | |
| 7,721,630 B2 | 5/2010 | Hunter | |
| 7,726,217 B2 | 6/2010 | Engvall et al. | |
| 7,730,810 B1 | 6/2010 | Janson | |
| 7,748,298 B2 | 7/2010 | Brown | |
| 7,861,622 B2 | 1/2011 | Chervenak et al. | |
| D635,427 S | 4/2011 | Chervenak et al. | |
| D635,428 S | 4/2011 | Lucas | |
| 7,992,470 B2 | 8/2011 | Brown | |
| 8,024,998 B1 | 9/2011 | Valencia | |
| 8,056,451 B2 | 11/2011 | Chervenak et al. | |
| D651,060 S | 12/2011 | Chervenak et al. | |
| D653,092 S | 1/2012 | Carra | |
| 8,122,792 B2 | 2/2012 | Engvall et al. | |
| 8,186,246 B2 | 5/2012 | Niven | |
| 8,225,700 B2 | 7/2012 | Hile | |
| 8,266,990 B1 | 9/2012 | Janson | |
| 8,302,512 B2 | 11/2012 | Shih | |
| 8,402,863 B2 | 3/2013 | Brown | |
| 8,408,100 B2 | 4/2013 | Liu | |
| 8,429,948 B1 | 4/2013 | Warren | |
| 8,479,618 B2 | 7/2013 | Hsiao | |
| 8,631,725 B2 | 1/2014 | Tuan-Mu | |
| 8,833,209 B2 | 9/2014 | Brown | |
| 8,950,299 B2 | 2/2015 | Wu | |
| 9,027,447 B2 | 5/2015 | Cripps | |
| 9,216,494 B2 | 12/2015 | Lai | |
| 9,242,349 B2 | 1/2016 | Battenfeld | |
| 9,496,671 B2 | 11/2016 | Dierks et al. | |
| D782,891 S | 4/2017 | Hyma | |
| 9,634,451 B2 | 4/2017 | Battenfeld | |
| D801,770 S | 11/2017 | Bridges et al. | |
| 9,844,857 B2 | 12/2017 | Skodje et al. | |
| 11,247,308 B2 | 2/2022 | Blumenthal et al. | |
| 2003/0019045 A1 * | 1/2003 | Ping | B25B 7/123 7/128 |
| 2003/0131647 A1 | 7/2003 | Chin | |
| 2006/0022178 A1 | 2/2006 | Wagner | |
| 2010/0018362 A1 | 1/2010 | Chervenak et al. | |
| 2010/0186558 A1 * | 7/2010 | Hile | B25B 7/123 81/370 |
| 2011/0107880 A1 | 5/2011 | Stucky | |
| 2011/0203421 A1 | 8/2011 | Chervenak et al. | |
| 2012/0096998 A1 | 4/2012 | Shih | |
| 2012/0318107 A1 | 12/2012 | Mann | |
| 2013/0014618 A1 | 1/2013 | Wu | |
| 2013/0047794 A1 | 2/2013 | Huang | |
| 2013/0192429 A1 | 8/2013 | Cripps | |
| 2013/0239759 A1 | 9/2013 | Huang | |
| 2015/0000477 A1 | 1/2015 | Wu | |
| 2015/0217430 A1 | 8/2015 | Wu | |
| 2015/0239102 A1 | 8/2015 | Wu | |
| 2015/0283681 A1 | 10/2015 | Wu | |
| 2016/0039072 A1 | 2/2016 | Wu | |
| 2017/0246731 A1 | 8/2017 | Wu | |
| 2018/0021925 A1 | 1/2018 | Bridges et al. | |

FOREIGN PATENT DOCUMENTS

| | | | |
|---|---|---|---|
| CN | 101306519 | A | 11/2008 |
| CN | 101432101 | | 5/2009 |
| CN | 101704227 | | 5/2010 |
| CN | 201483397 | U | 5/2010 |
| CN | 101913126 | | 12/2010 |
| CN | 101659041 | B | 3/2015 |
| CN | 102873654 | B | 9/2015 |
| CN | 104139347 | B | 9/2016 |
| CN | 206216529 | U | 6/2017 |
| DE | 1810295 | | 4/1960 |
| DE | 3909603 | | 9/1990 |
| DE | 29703681 | U1 | 6/1997 |
| DE | 20302867 | U1 | 5/2003 |
| DE | 102006039759 | | 2/2008 |
| DE | 202013101985 | U1 | 5/2013 |
| EP | 0861707 | B1 | 5/2002 |
| EP | 2149428 | A1 | 2/2010 |
| EP | 2546028 | B1 | 8/2014 |
| EP | 2801444 | A1 | 11/2014 |
| WO | WO 0166311 | | 9/2001 |
| WO | WO 2015024405 | | 2/2015 |
| WO | WO 2017165591 | A1 | 9/2017 |

* cited by examiner

LOCKING PLIERS

CROSS-REFERENCE TO RELATED APPLICATIONS

This application is a divisional application of U.S. patent application Ser. No. 16/137,970, filed on Sep. 21, 2018 which is a continuation of International Application No. PCT/US2017/023721, filed on Mar. 23, 2017, which claims priority to U.S. Provisional Application No. 62/311,983, filed on Mar. 23, 2016, which are incorporated herein by reference in their entireties.

FIELD OF THE INVENTION

The present invention relates to locking pliers and, more particularly, to locking pliers having an improved clamping force.

BACKGROUND OF THE INVENTION

Locking pliers typically include a fixed jaw, a moveable jaw, and an over-center linkage operable to lock the moveable jaw in an adjustable position with respect to the fixed Jaw.

SUMMARY OF THE INVENTION

The invention provides, in one aspect, a hand tool including a first jaw, a first handle fixed to the first jaw, a second jaw, and a second handle pivotally coupled to the second jaw. The hand tool further includes a link member having a first end pivotally coupled to at least one selected from the group of the first jaw and the first handle, and a second end pivotally coupled to the second jaw.

The invention provides, in another aspect, a hand tool including a first handle, a first jaw pivotally coupled to the first handle, a second jaw pivotally coupled to the first jaw, and a second handle pivotally coupled to the second jaw.

Other aspects of the invention will become apparent by consideration of the detailed description and accompanying drawings.

Figure 1:
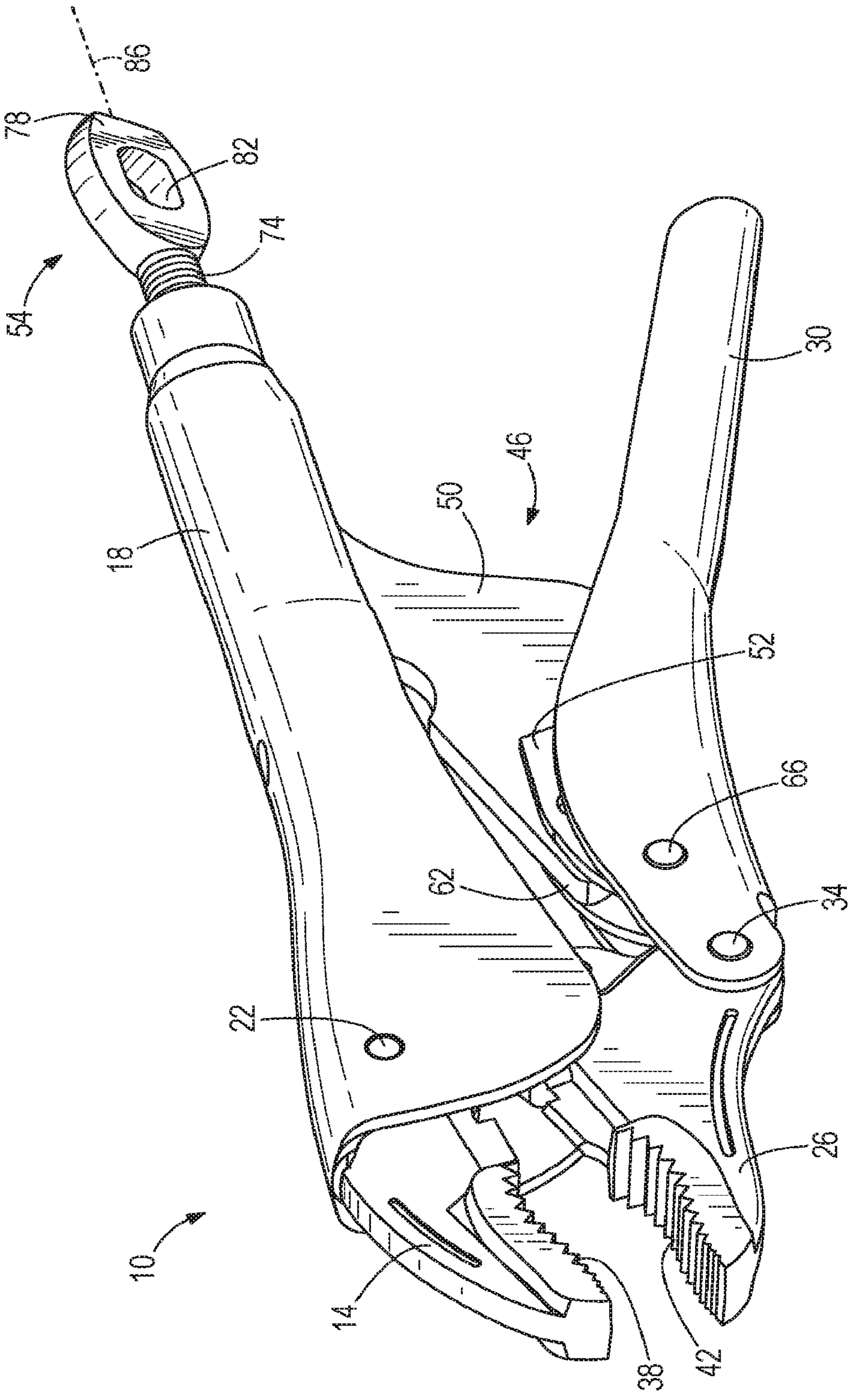
FIG. 1 is a perspective view of a locking pliers according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION OF THE INVENTION

With reference to FIG. 1-6, a hand tool in the form of a locking pliers 10 is illustrated according to an embodiment of the invention. The locking pliers 10 include a fixed first jaw 14 and a first handle 18 fixed to the first jaw 14 at a first pivot pin 22. The locking pliers 10 also include a moveable second jaw 26 and a second handle 30 pivotally coupled to the second jaw 26 at a second pivot pin 34. The second handle 30 pivots about the second pivot pin 34 to move the jaws 14, 26 between an open position (e.g., FIG. 4) and a closed position (e.g., FIGS. 2 and 3). In other words, the second handle 30 pivots with respect to the first handle 18 to increase or decrease a distance between the fixed first jaw 14 and the moveable second jaw 26. The illustrated jaws 14, 26 include curved plier jaw faces 38, 42; however, in other embodiments, the jaw faces may be C-shaped clamping arms or any type of jaw face. The jaws 14, 26 are made of chrome plated, forged alloy steel for high durability and corrosion resistance. In other embodiments, the jaws 14, 26 can be made of other materials.

Figure 2:
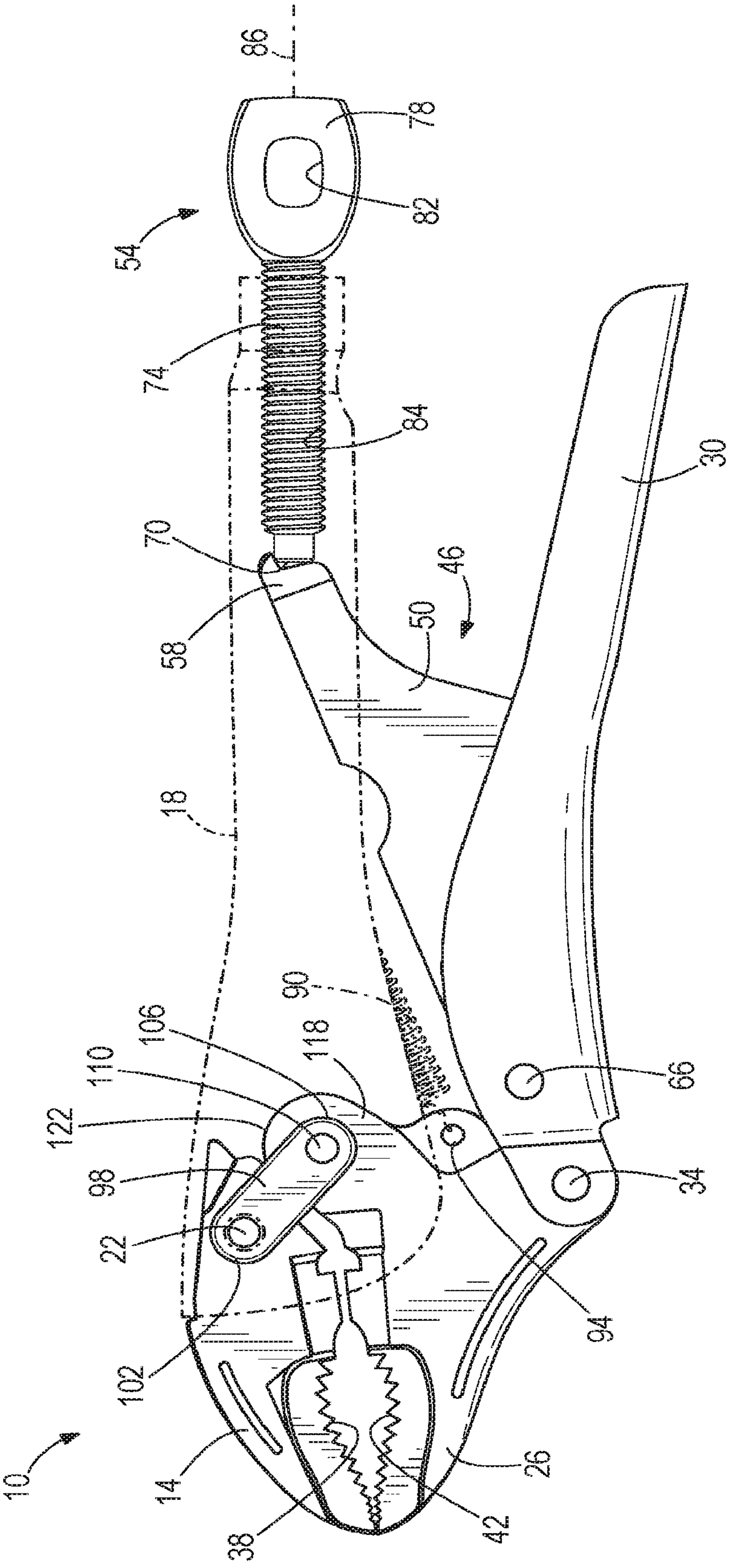
FIG. 2 is a side view of the locking pliers of FIG. 1, shown in a position with the lower handle closed and the jaws closed.

With continued reference to FIG. 2, the locking pliers 10 further includes a locking mechanism 46 that is operable to retain the pliers 10 in the closed position. The locking mechanism 46 includes a lock link member 50, a compound toggle link 52 (FIG. 1), and an adjustment member 54 (a.k.a. a control key). A first end 58 of the lock link member 50 is slidably coupled to the first handle 18 and is axially moveable along the first handle 18. A second end 62 of the lock link member 50 is pivotally coupled to the toggle link 52, and the toggle link 52 is pivotally coupled to the second handle 30 at a third pivot pin 66. In some embodiments, lock link member 50 is directly pivotally coupled to the second handle 30 and the toggle link 52 is replaced with a release lever provided to release the pliers from the locked closed position.

The adjustment member 54 includes an engagement surface 70 at one end, a threaded shank 74, and a flange 78 extending from the shank 74 opposite the engagement surface 70. In the illustrated embodiment, an elongate opening 82 is formed on the flange 78. The adjustment member 54 is integrally formed as a single component from metal such as by casting, forging, and the like. The threaded shank 74 defines a longitudinal axis 86 (i.e., an adjustment axis) and is received by a threaded bore 84 in an end of the first handle 18 opposite the first jaw 14. The adjustment member 54 is rotatable relative to the first handle 18 to translate the adjustment member 54 in an axial direction along the longitudinal axis 86 (FIGS. 2 and 3).

Figure 3:
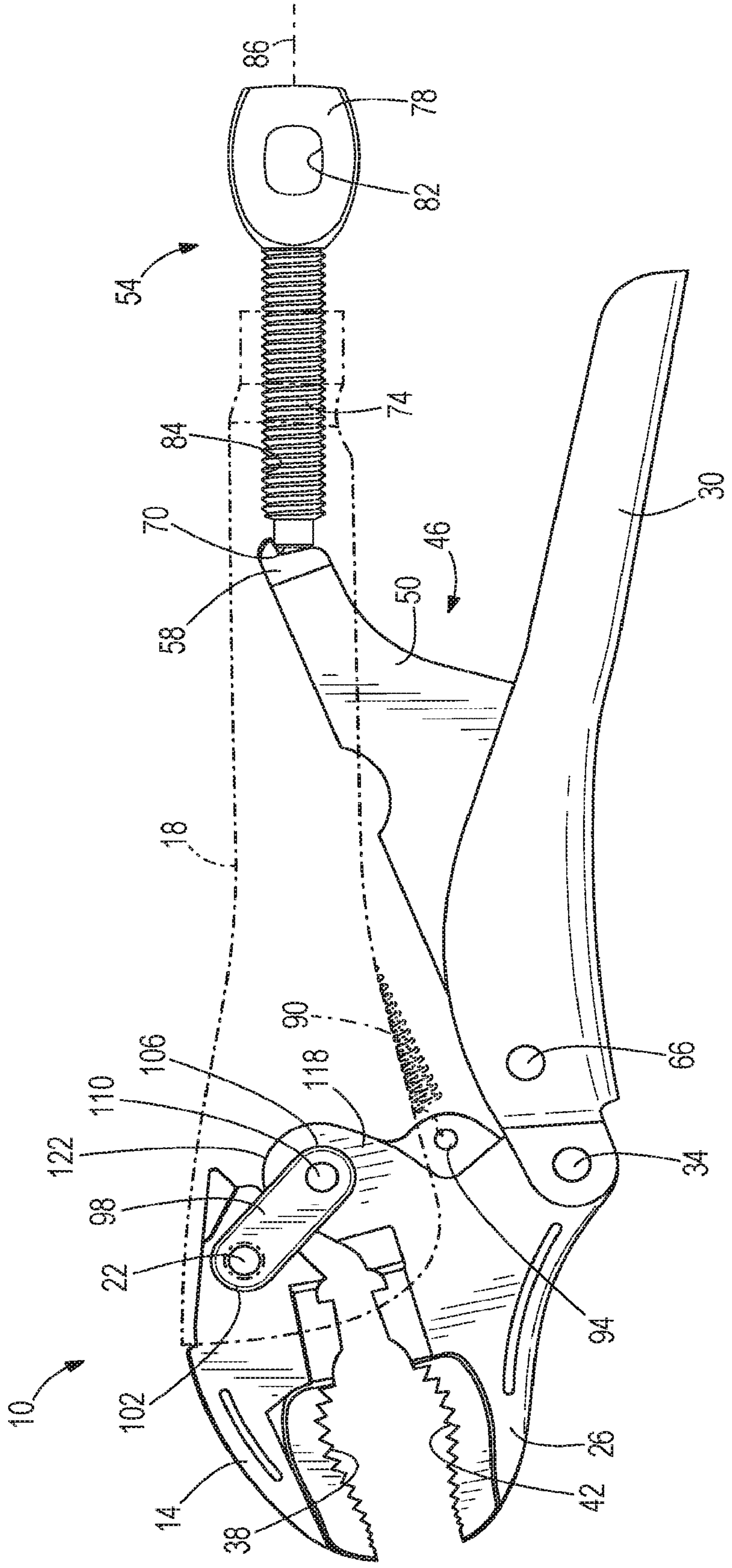
FIG. 3 is a side view of the locking pliers of FIG. 1, shown in a position with the lower handle closed and the jaws opened.

With continued reference to FIGS. 2 and 3, moving engagement between the engagement surface 70 and the first end 58 of the lock link member 50 causes the lock link member 50 to move with respect to the third pivot pin 66, adjusting the force the jaws 14, 26 exert on a workpiece when the pliers 10 is in the closed position. In other words, changing the position of the adjustment member 54 relative to the first handle 18 changes the distance between the first jaw 14 and the second jaw 26 when the second handle 30 is in a closed position. With reference to FIG. 2, the adjustment member 54 is in a first position, corresponding to the first jaw 14 and the second jaw 26 being closed together (i.e., jaw faces 38, 42 are touching). If the adjustment member 54 is rotated to extend from the first handle 18, as shown in FIG. 3, the second jaw 26 is now spaced from the first jaw 14.

In addition, the locking pliers 10 further includes a spring 90 coupled between the second jaw 26 and the first handle 18. More specifically, the spring 90 is coupled to an aperture 94 formed on the second jaw 26 at one end of the spring 90 and coupled to an underside of the first handle 18 at an opposite end of the spring 90. The spring 90 biases the second jaw 26 toward the first handle 18, along the longitudinal axis of the spring 90.

Figure 5:
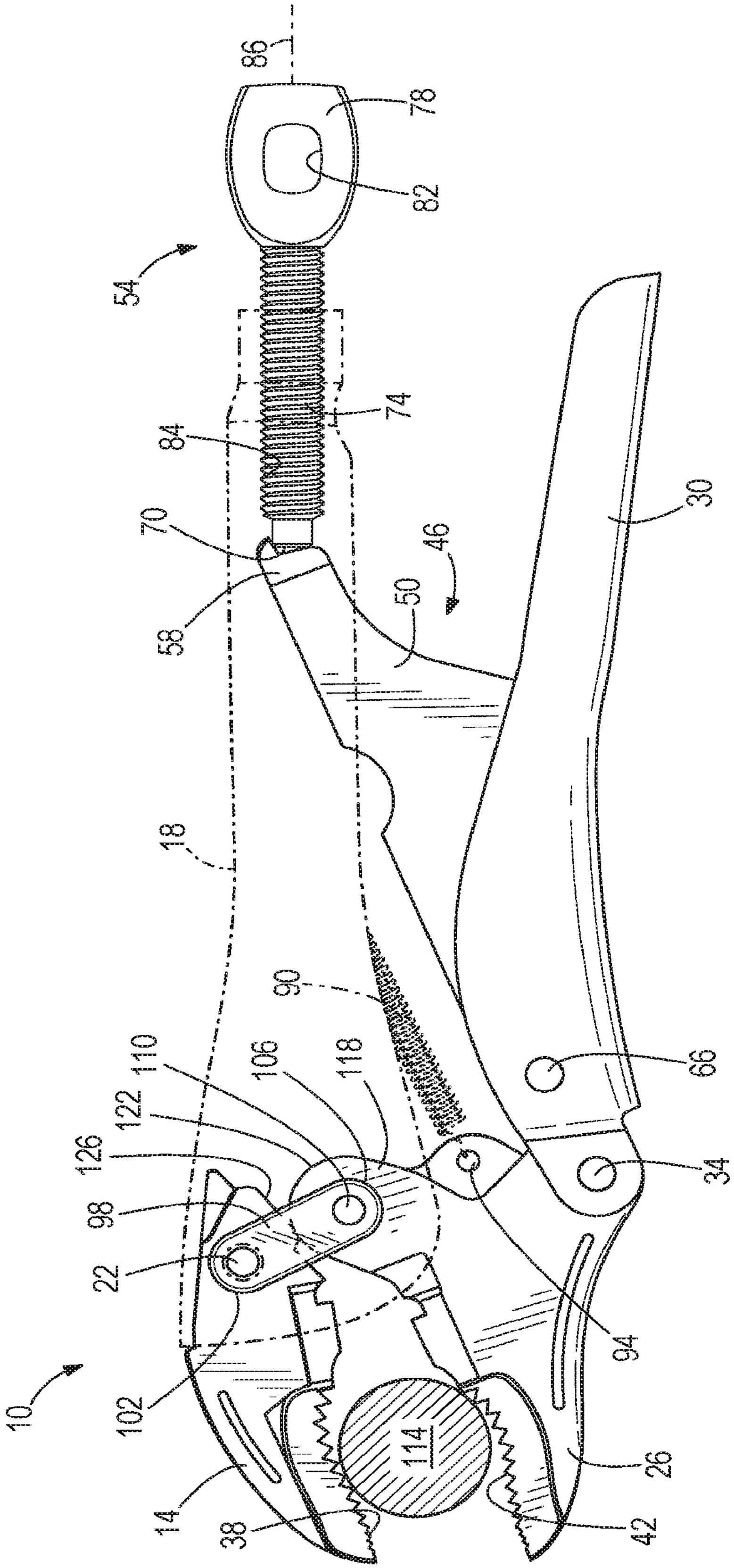
FIG. 5 is a side view of the locking pliers of FIG. 1, shown in a position with the lower handle closed and a workpiece positioned between the closed jaws.
Figure 6:
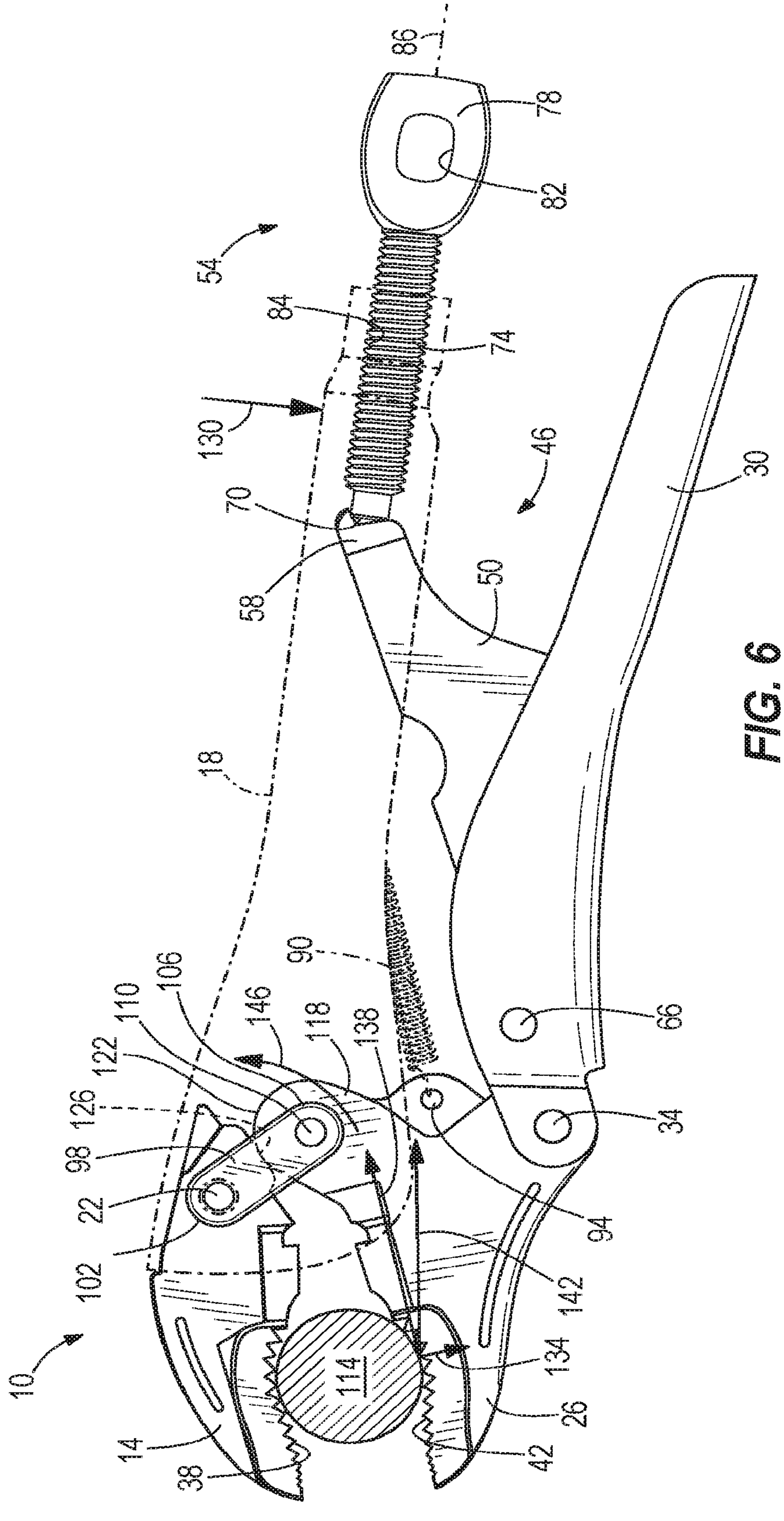
FIG. 6 is a side view of the locking pliers of FIG. 1, shown in a position with the lower handle closed and a workpiece position between the closed jaws, with the lower jaw in an energized configuration increasing the clamping force on the workpiece.
Figure 7:
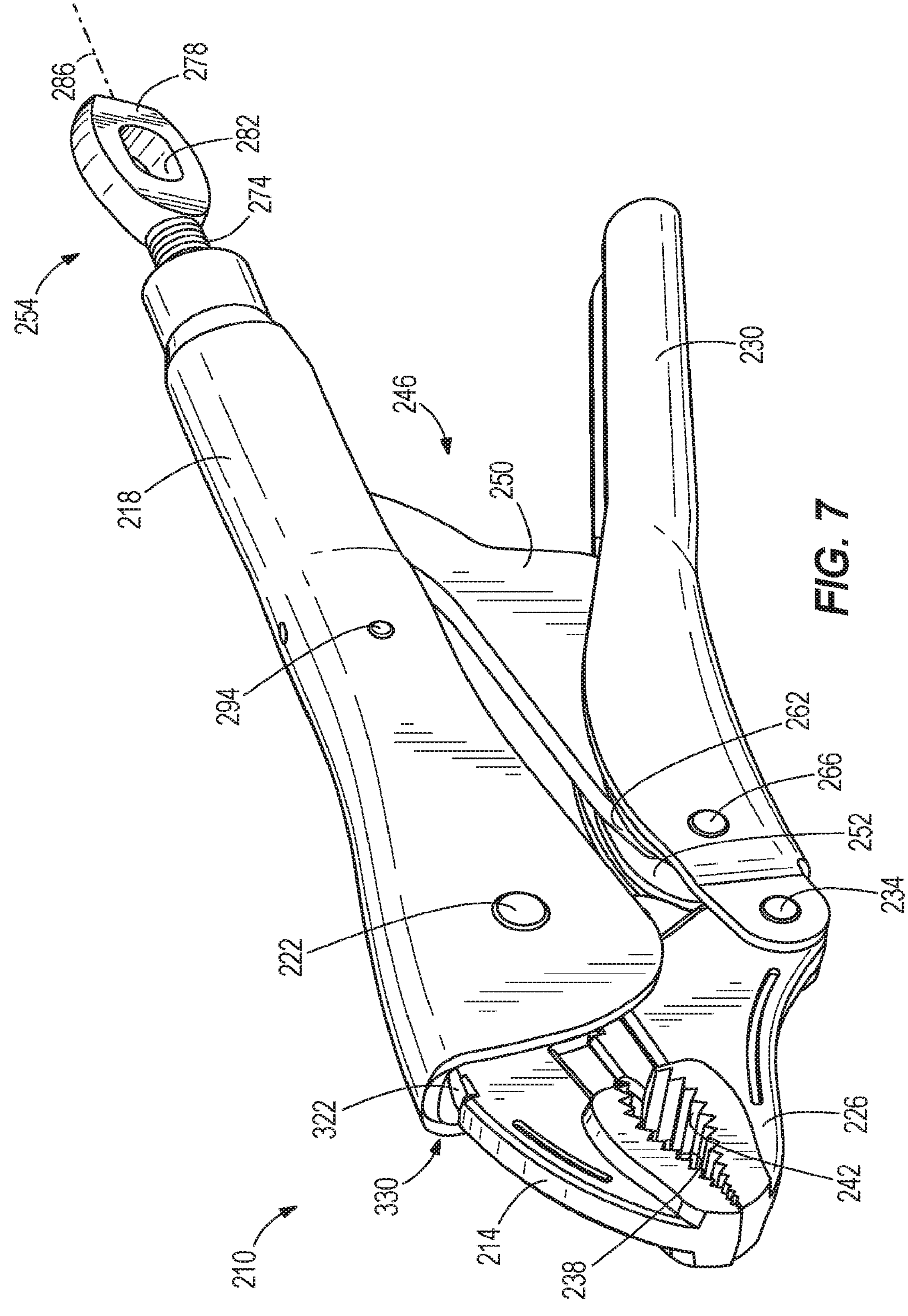
FIG. 7 is a perspective view of a locking pliers according to another embodiment of the invention.

With continued reference to FIG. 2, the locking pliers 10 further includes a jaw link member 98 with a first end 102 pivotally coupled to the first jaw 14 at the first pivot pin 22. In other embodiments, the first end 102 of the jaw link member 98 is pivotally coupled to the first handle 18. In further embodiments, the first end 102 of the jaw link member 98 is pivotally coupled to both the first jaw 14 and the first handle 18. The jaw link member 98 also includes a second end 106 pivotally coupled to the second jaw 26 at a fourth pivot pin 110. As explained in greater detail below, the jaw link member 98 allows the second jaw 26 to move with respect to the first jaw 14. The jaw link member 98, fourth pivot pin 110, and the second jaw 26 are configured to move with respect to the first jaw 14 even when a workpiece 114 is secured between the jaws 14, 26 (FIGS. 5 and 6). In particular, the jaw link member 98 pivots about the first pivot pin 22, which is fixed relative to the first jaw 14 and the first handle 18. In addition, the second end 106 of the jaw link member 98 pivots about the fourth pivot pin 110, which is positioned on a rear lobe 118 of the second jaw 26.

With reference to FIGS. 2-6, the movement of the second jaw 26 is constrained by the jaw link member 98 and also by the engagement of a curved cam surface 122 formed on the second jaw 26 and a corresponding linear cam surface 126 formed on the first jaw 14. In other embodiments, the cam surfaces 122, 126 may be any shape including having a linear cam surface formed on the second jaw 26 and a curved cam surface formed on the first jaw 14. The cam surfaces 122, 126 partially limit the travel of the second jaw 26 with respect to the first jaw 14. In other words, the cam surface 122 abuts the cam surface 126 to limit the range of motion of the second jaw 26 with respect to the first jaw 14.

Figure 4:
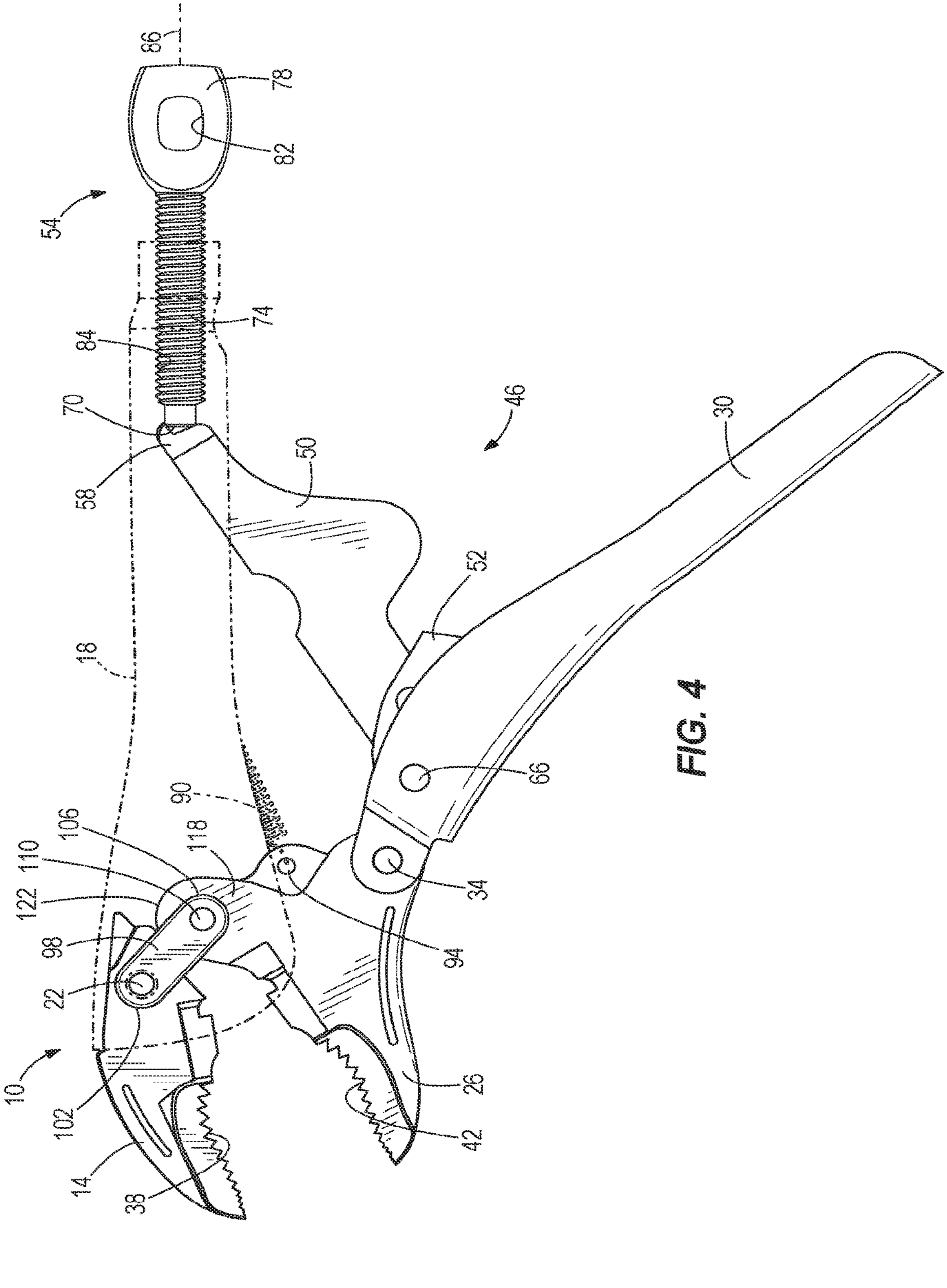
FIG. 4 is a side view of the locking pliers of FIG. 1, shown in a position with the lower handle opened and the jaws opened.

In operation, the locking pliers 10 begin with the first jaw 14 and the second jaw 26 in a closed position, and with the second handle 30 in a closed position, as shown in FIG. 2. As discussed above, a user may adjust the distance between the first jaw 14 and the second jaw 26 while the handles 18, 30 are closed by rotation of the adjustment member 54, as shown in FIG. 3. The second handle 30 is then opened with respect to the first handle 18, as shown in FIG. 4, to further increase the distance between the first jaw 14 and the second jaw 26. With the jaws 14, 26 in an open position, the user positions the jaws 14, 26 around the workpiece 114 and then pivots the second handle 30 about the second pivot pin 34 towards the first handle 18 to move the second jaw 26 toward the closed position (FIG. 5). The user may then grasp the flange 78 and rotate the adjustment member 54 relative to the first handle 18 to decrease the distance between the jaws 14, 26 and thereby increase the clamping force when the jaws 14, 26 contact the workpiece 114. When a high clamping force is desired, the user can insert an elongated member (e.g., a screwdriver) through the elongate opening 82 to assist in rotating the adjustment member 54 while the jaws 14, 26 remain clamped on the workpiece 114.

With reference to FIG. 6, when the jaws 14, 26 are secured around the workpiece 114 and an external force 130 is applied to the first handle 18 by a user, the second jaw 26 and jaw link member 98 move with respect to the first jaw 14 to increase the clamping force applied to the workpiece 114. More specifically, when the external force 130 is applied to the first handle 18, the force is transferred through the workpiece 114 to the second jaw 26 as a normal force 134 and a tangential force 138. The normal force 134 and the tangential force 138 combine to form an overall resultant reaction force 142 acting on the second jaw 26, which causes rotation of the second jaw 26 in a direction 146 about the first pivot pin 22. In other words, when a user applies the force 130, the jaw faces 38, 42 are formed such that reaction force 142 from the workpiece 114 on the second jaw 26 causes rotation of the second jaw 26 and the corresponding jaw link member 98. Rotation of the second jaw 26 in the direction 146 shown in FIG. 6, results in the jaws 14, 26 (and more specifically the jaw faces 38,42) moving closer together. As such, the application of the external force 130 causes the second jaw 26 to become "energized" and to increase the amount of clamping force applied to the workpiece 114.

In other words, when the jaws 14, 26 are closed and locked on the workpiece 114 and an external force 130 is applied to try and turn the workpiece 114 (FIG. 6), the jaw link member 98 and the second jaw 26 rotate backwards and upwards in the rotational direction 146. As the moveable second jaw 26 moves in the direction 146, the jaw link member 98 constrains the motion of the second jaw 26 to move toward the fixed first jaw 14 such that the gripping force exerted on the workpiece 114 is increased as the external force 130 applied to the locking pliers 10 increases. As a result, the locking pliers 10 resist slipping on the workpiece 114 at higher applied torques.

With reference to FIGS. 12-17, a hand tool in the form of a locking pliers 410 is illustrated according to another embodiment of the invention. The locking pliers 410 is similar to the locking pliers 10 of FIGS. 1-6, with only the differences described herein. Components of the locking pliers 410 that are similar to the locking pliers 10 are referenced with similar reference numerals, incremented by "400".

Figure 12:
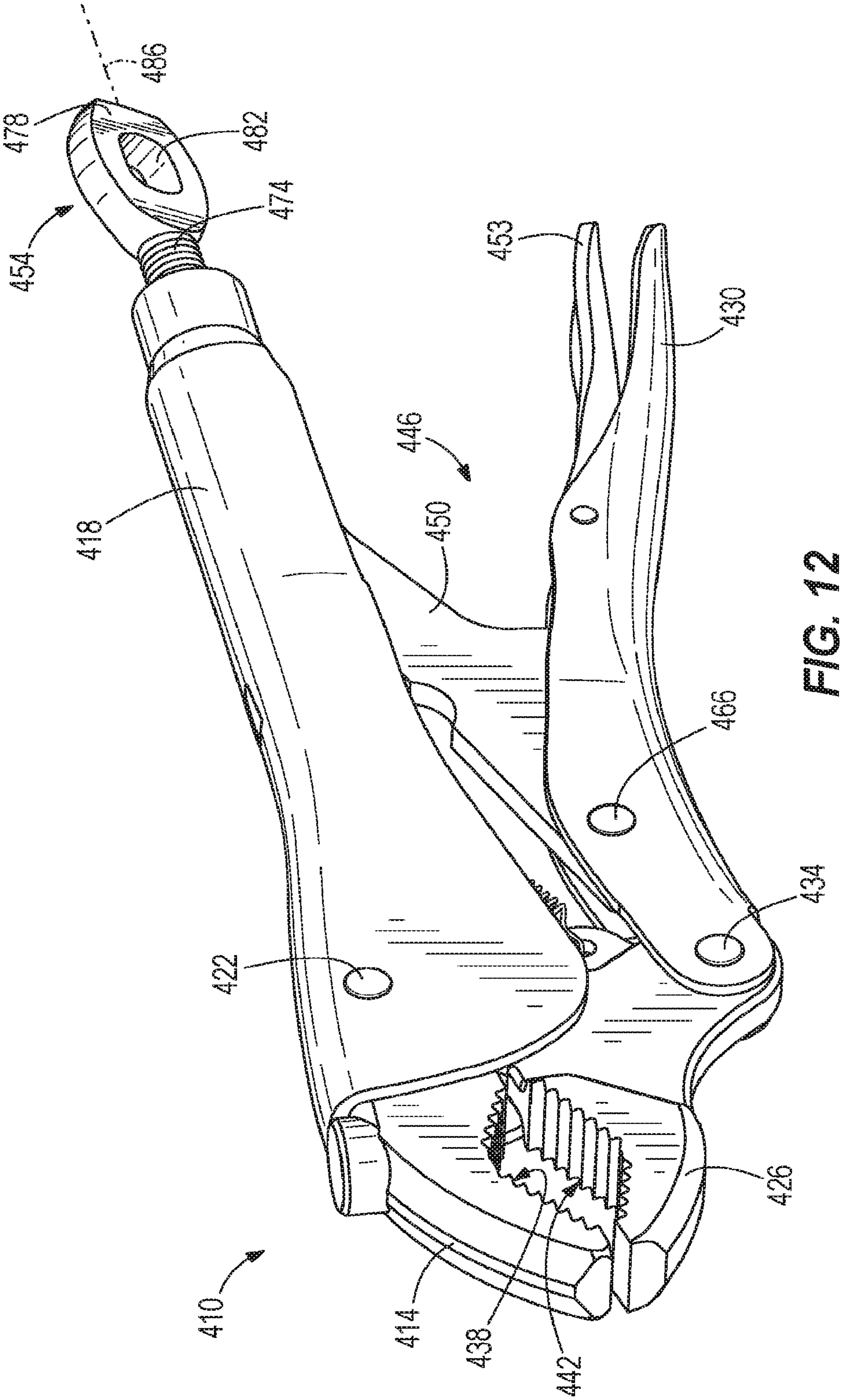
FIG. 12 is a perspective view of a locking pliers according to another embodiment of the invention.
Figure 12A:
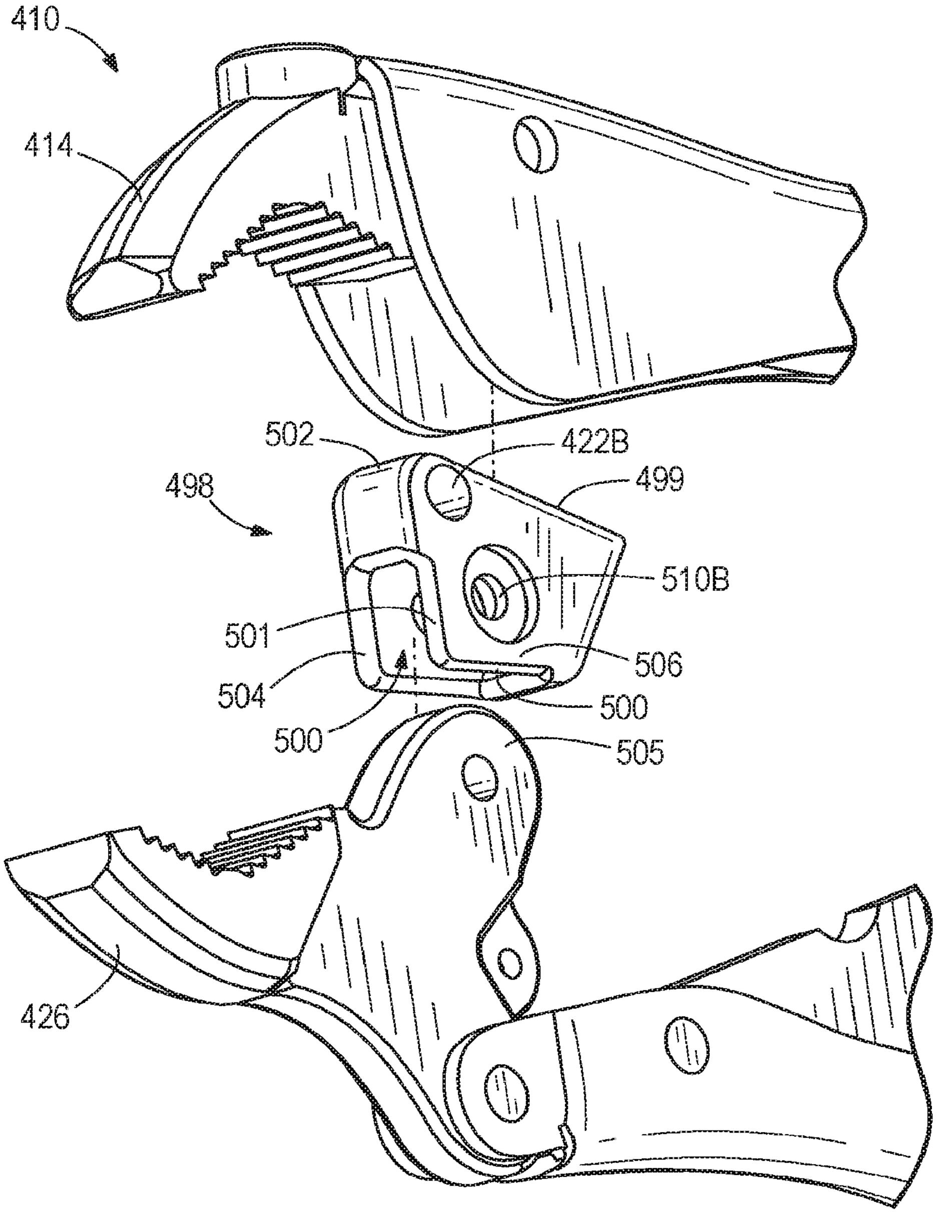
FIG. 12A is an exploded partial view of the locking pliers of FIG. 12.
Figure 13:
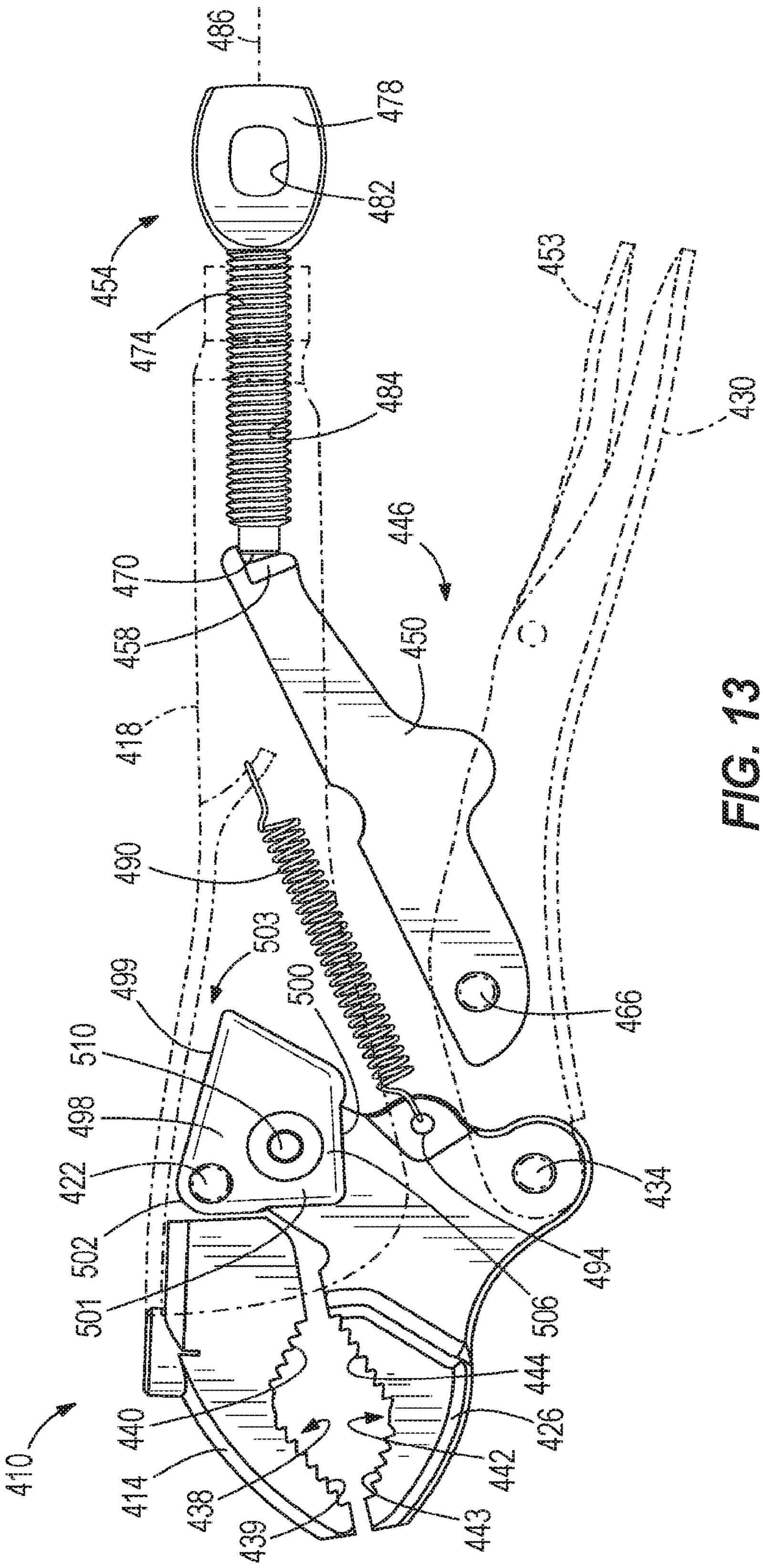
FIG. 13 is a side view of the locking pliers of FIG. 12, shown in a position with the lower handle closed and the jaws closed.
Figure 14:
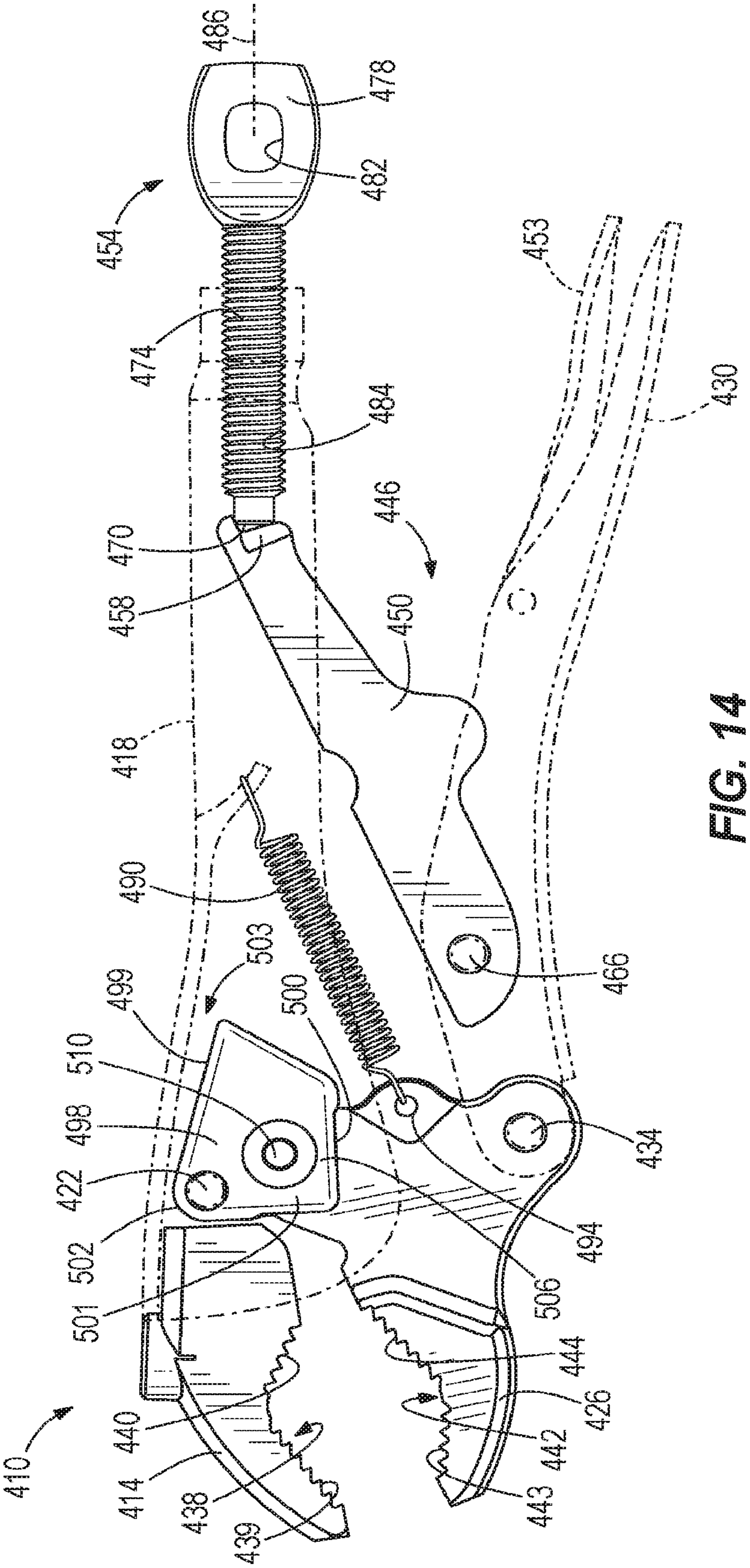
FIG. 14 is a side view of the locking pliers of FIG. 12, shown in a position with the lower handle closed and the jaws opened.
Figure 15:
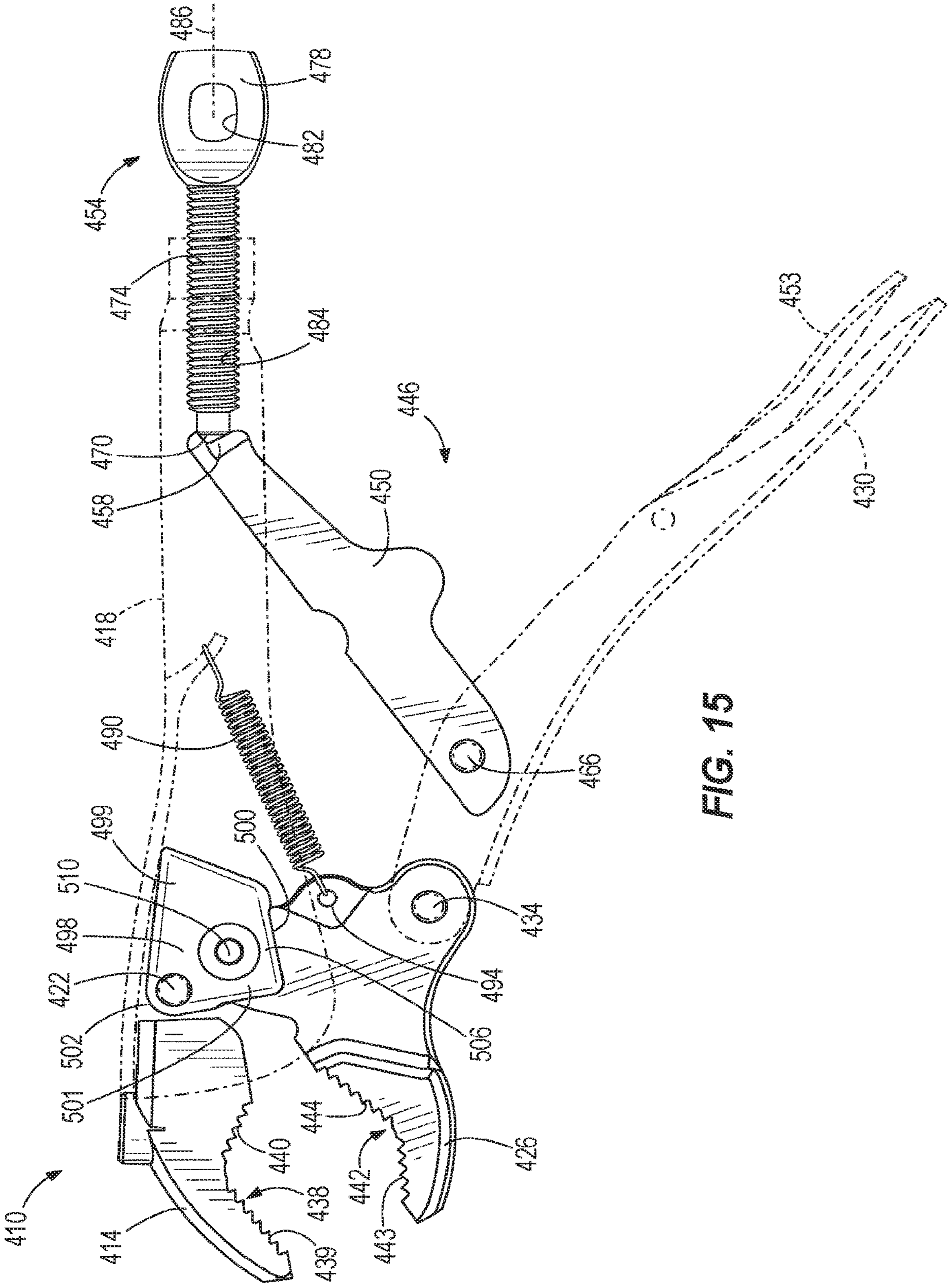
FIG. 15 is a side view of the locking pliers of FIG. 12, shown in a position with the lower handle opened and the jaws opened.

With reference to FIGS. 13-15, the locking pliers 410 includes a first jaw 414, a first handle 418 fixed to the first jaw 414, a second jaw 426, and a second handle 430 pivotally coupled to the second jaw 426. The locking pliers 410 further includes a jaw link member 498 with a first end 502 pivotally coupled to the first handle 418 at a first pivot pin 422. The jaw link member 498 also includes a second end 506 pivotally coupled to the second jaw 426 at a fourth pivot pin 510. In addition, with reference to FIG. 12A, the jaw link member 498 includes a slot 500 defined by a first flange 501 and a second flange 504, opposite the first flange 501. In other words, a portion 505 of the second jaw 426 is received within the slot 500. The pivot pins 422 and 510 are not illustrated in FIG. 12A for clarity. Instead, bores 422B, 510B that extend through the jaw link member 498 are shown through. The bores 422B, 510B receive the pivot pins 422,510, respectively. Also, the jaw link member 498 includes an engagement surface 499 that engages with the first handle 418 to limit the rotation of the jaw link member 498 with respect to the first handle 418. More specifically, a gap 503 is formed between the jaw link member 498 and the first handle 418 (FIGS. 13-14), but the gap 503 is eliminated as the jaw link member 498 rotates and abuts the first handle 418 (FIG. 15).

With continued reference to FIGS. 13-15, the first jaw 414 includes an upper jaw face 438 and the second jaw 426 includes a lower jaw face 442. Both the upper and lower jaw faces 438, 442 are generally V-shaped. In particular, the upper jaw face 438 includes a first face 439 and a second face 440 angled with respect to each other, and the lower jaw face 442 includes a first face 443 and a second face 444 angled with respect to each other. In addition, the locking pliers 410 further includes a release lever 453 at least partially positioned between the second handle 430 and the lock member 450. A second end 462 of the lock member 450 is pivotally coupled to the second handle 430 at a third pivot pin 466. In other words, the release lever 453 is provided in place of a compound toggle link that acts as a quick-released (for example, the toggle link 52 of FIG. 1). As such, a user depresses the release lever 453 to manually release the locking pliers 410 from the locked position.

Figure 16:
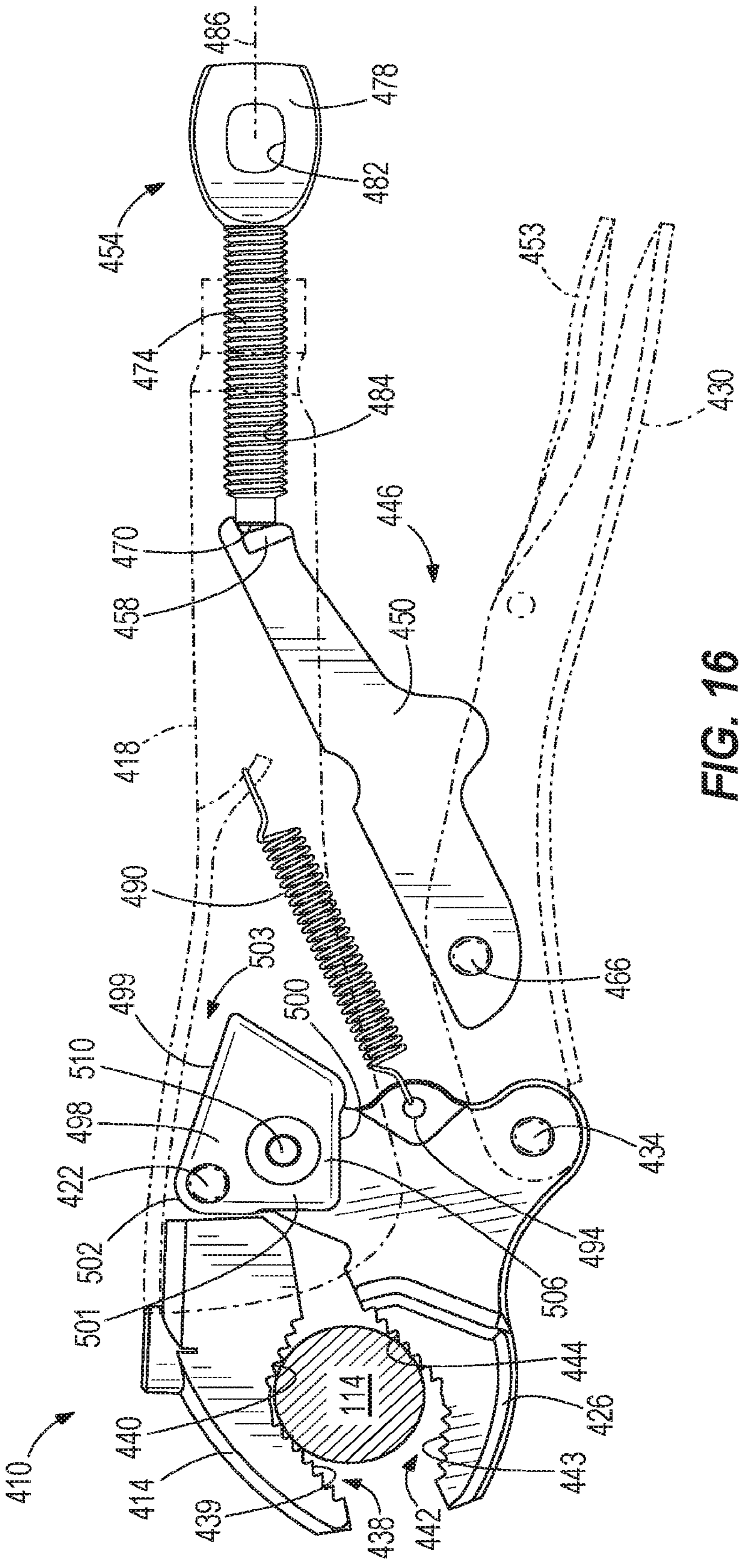
FIG. 16 is a side view of the locking pliers of FIG. 12, shown in a position with the lower handle closed and a workpiece positioned between the closed jaws.

In operation, the locking pliers 410 begins with the first jaw 414 and the second jaw 426 in a closed position, and with the second handle 430 in a closed position, as shown in FIG. 13. As discussed above, a user may adjust the distance between the first jaw 414 and the second jaw 426 while the handles 418,430 are closed by rotation of the adjustment member 454, as shown in FIG. 14. The second handle 430 is then opened with respect to the first handle 418, as shown in FIG. 15, to further increase the distance between the first jaw 414 and the second jaw 426. With the jaws 414, 426 in an open position, the user positions the jaws 414, 426 around the workpiece 114 and then pivots the second handle 430 about the second pivot pin 434 towards the first handle 418 to move the second jaw 426 toward the closed position (FIG. 16).

Figure 17:
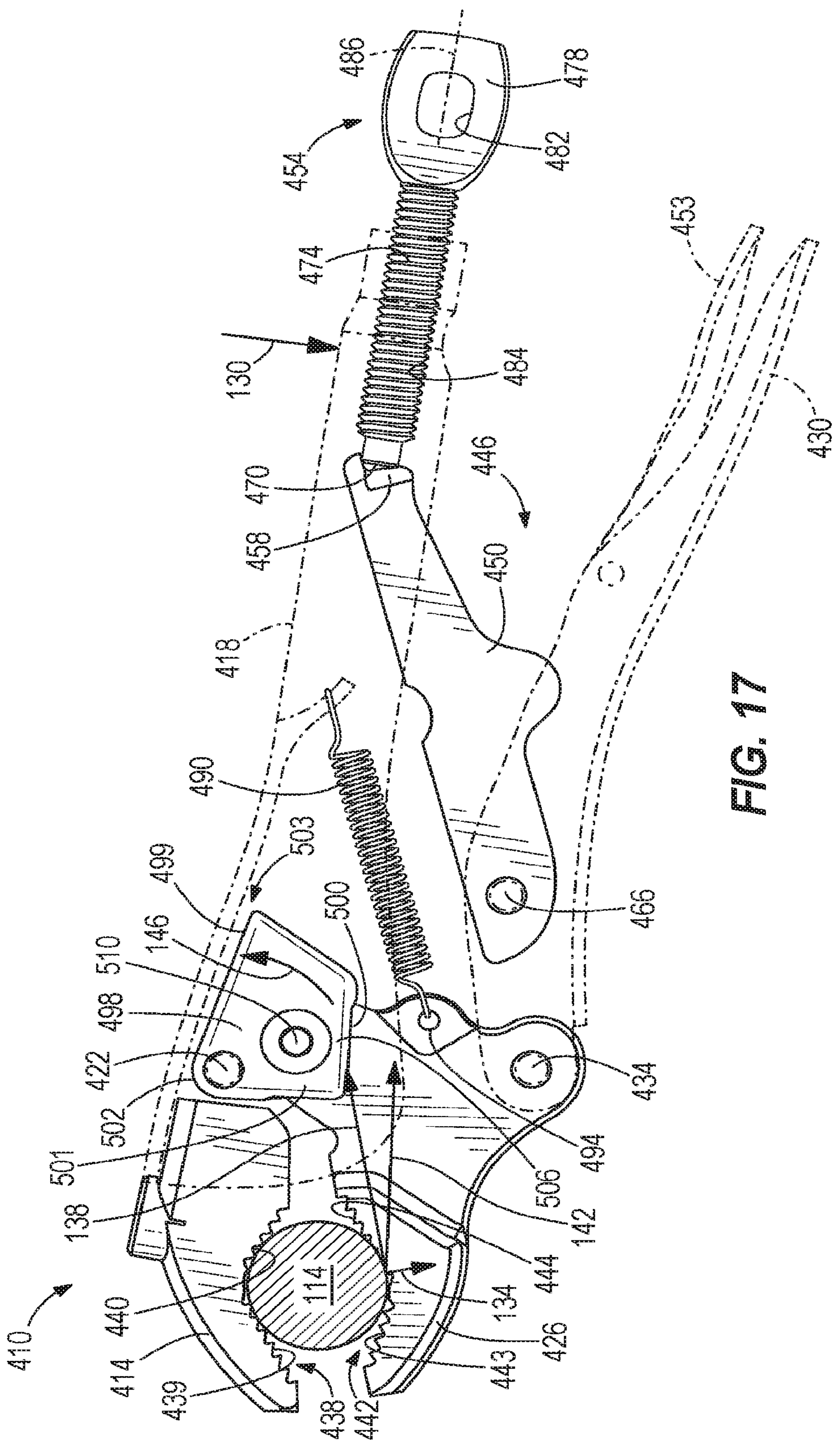
FIG. 17 is a side view of the locking pliers of FIG. 12, shown in a position with the lower handle closed and a workpiece positioned between the closed jaws, with the lower jaw in an energized configuration increasing the clamping force on the workpiece.
Figure 18:
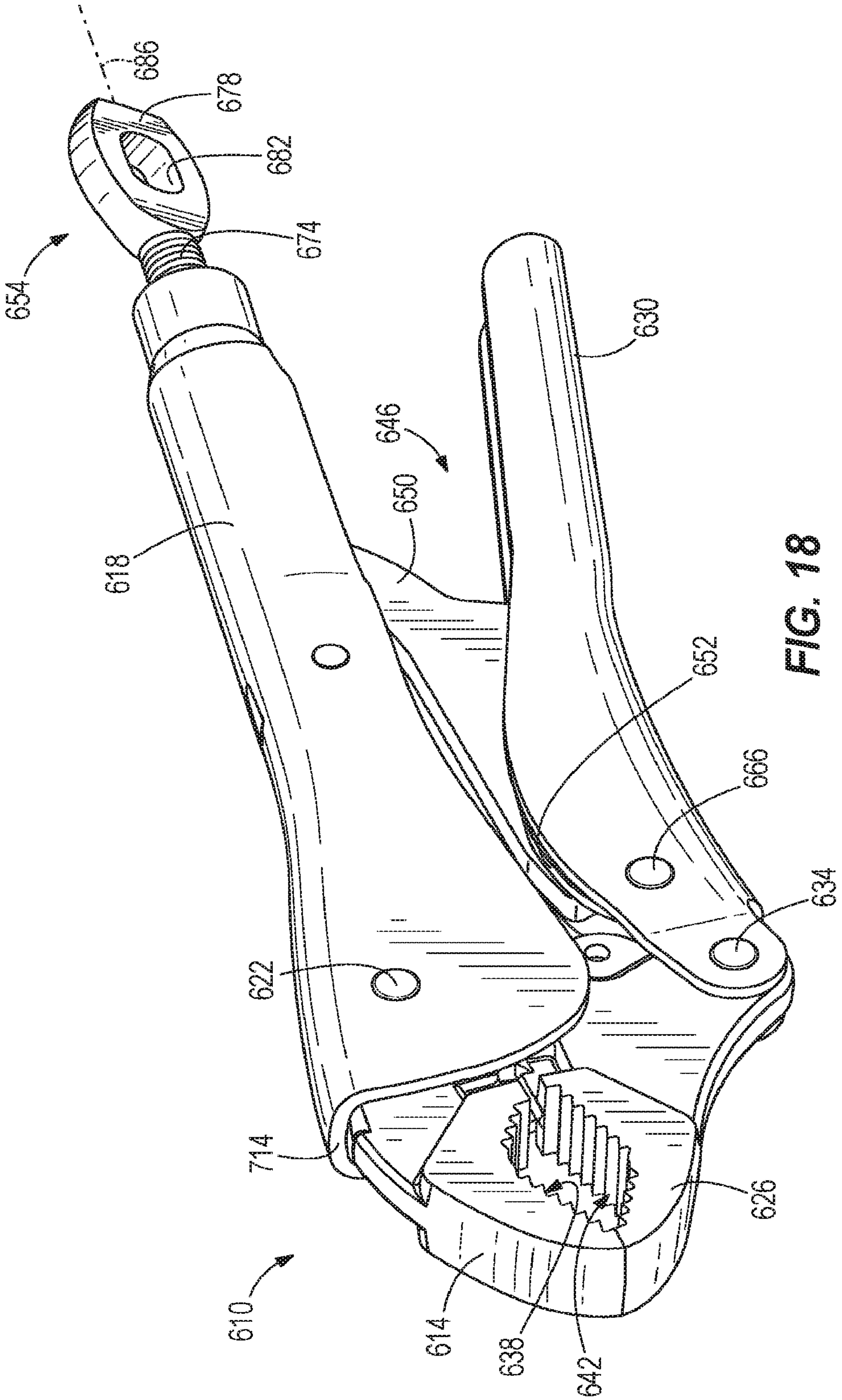
FIG. 18 is a perspective view of a locking pliers according to another embodiment of the invention.

With reference to FIG. 17, when the jaws 414, 426 are secured around the workpiece 114 and an external force 130 is applied to the first handle 418 by a user, the second jaw 426 and jaw link member 498 move with respect to the first jaw 414 (and with respect to the first handle 418) to increase the clamping force applied to the workpiece 114. Operation of the locking pliers 410 is therefore similar to the operation of the locking pliers 10, described above. More specifically, when the external force 130 is applied to the first handle 418, the force is transferred through the workpiece 114 to the second jaw 426 as a normal force 134 and a tangential force 138. The normal force 134 and the tangential force 138 combine to form an overall resultant reaction force 142 acting on the second jaw 426, which causes rotation of the second jaw 426 in a direction 146 about the first pivot pin 422. In other words, when a user applies the force 130, the jaw faces 438, 442 are formed such that reaction force 142 from the workpiece 114 on the second jaw 426 causes rotation of the second jaw 426 and the corresponding jaw link member 498. Rotation of the second jaw 426 in the direction 146 shown in FIG. 17, results in the jaws 414, 426 (and more specifically the jaw faces 438,442) moving closer together. As the second jaw 426 rotates in the direction 146, the gap 503 decreases. As such, the application of the external force 130 causes the second jaw 426 to become "energized" and to increase the amount of clamping force applied to the workpiece 114.

With reference to FIGS. 7-11, a hand tool in the form of a locking pliers 210 is illustrated according to another embodiment of the invention. The locking pliers 210 include a moveable first jaw 214 and a first handle 218 pivotally coupled to the moveable first jaw 214 at a first pivot pin 222. In other words, the first jaw 214 is movable with respect to the first handle 218. The locking pliers 210 also include a moveable second jaw 226 pivotally coupled to the first jaw 214 at the first pivot pin 222, and a second handle 230 pivotally coupled to the second jaw 226 at a second pivot pin 234. The second handle 230 pivots about the second pivot pin 234 to move the jaws 214, 226 between an open position (e.g., FIG. 10) and a closed position (e.g., FIGS. 8 and 9). In other words, the second handle 230 pivots with respect to the first handle 218 to increase or decrease a distance between the first jaw 214 and the second jaw 226. The illustrated jaws 214,226 include curved plied jaw faces 238,242; however, in other embodiments, the jaw faces may be C-shaped clamping arms or any type of jaw face. The jaws 214, 226 are made of chrome plated, forged alloy steel for high durability and corrosion resistance. In other embodiments, the jaws 214, 226 can be made of other materials.

Figure 8:
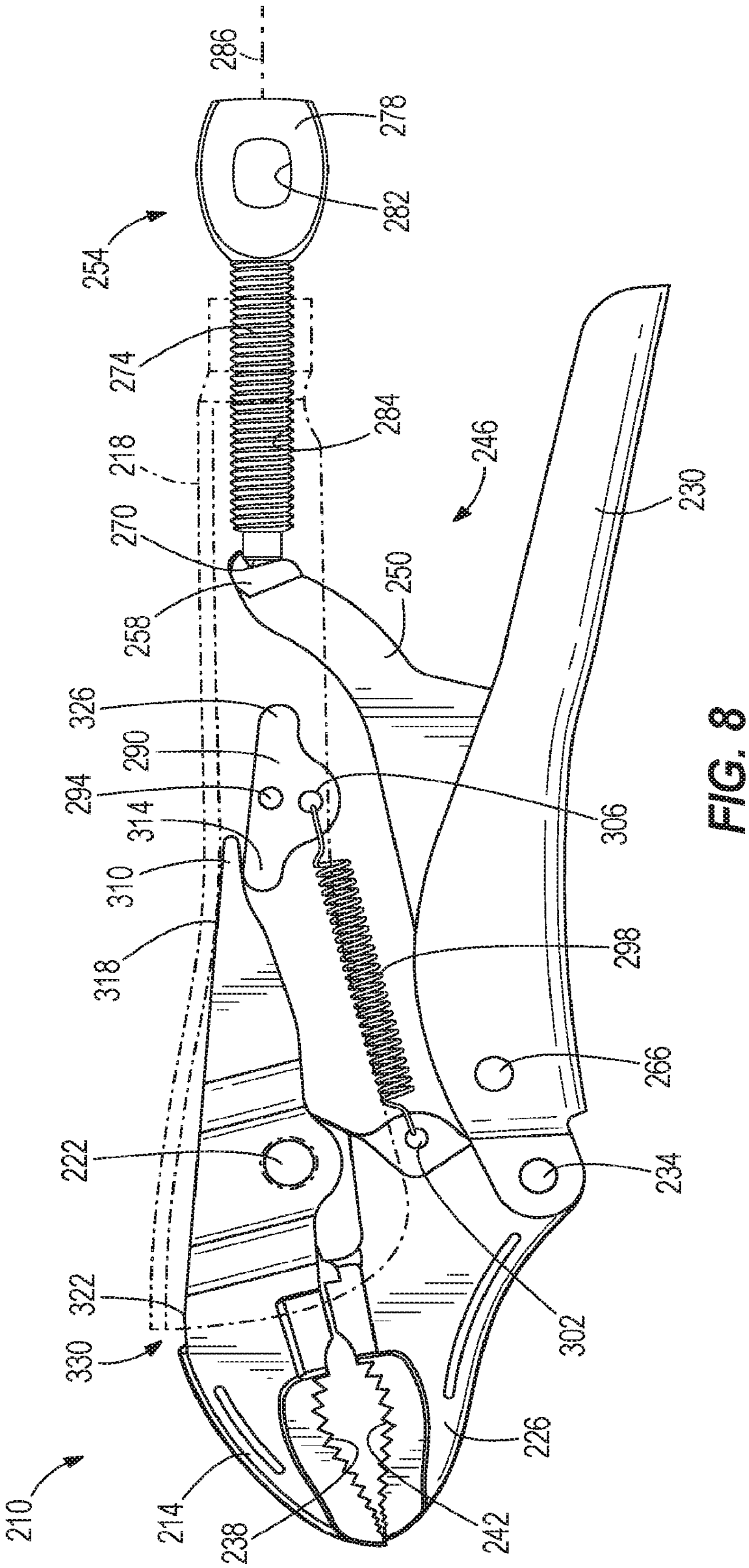
FIG. 8 is a side view of the locking pliers of FIG. 7, shown in a position with the lower handle closed and the jaws closed.

With continued reference to FIG. 8, the locking pliers 210 further includes a locking mechanism 246 that is operable to retain the pliers 210 in the closed position. The locking mechanism 246 includes a lock link member 250, a compound toggle link 252, and an adjustment member 254 (a.k.a. a control key). A first end 258 of the lock link member 250 is slidably coupled to the first handle 218 and is axially moveable along the first handle 218. A second end 262 of the lock link member 250 is pivotally coupled to the toggle link 252, and the toggle link 252 is pivotally coupled to the second handle 230 at a third pivot pin 266. In some embodiments, lock link member 250 is directly pivotally coupled to the second handle 230 and the toggle link 252 is replaced with a release lever provided to release the pliers from the locked closed position.

The adjustment member 254 includes an engagement surface 270 at one end, a threaded shank 274, and a flange 278 extending from the shank 274 opposite the engagement surface 270. In the illustrated embodiment, an elongate opening 282 is formed on the flange 278. The adjustment member 254 is integrally formed as a single component from metal such as by casting, forging, and the like. The threaded shank 274 defines a longitudinal axis 286 (i.e., an adjustment axis) and is received by a threaded bore 284 in an end of the first handle 218 opposite the first jaw 214. The adjustment member 254 is rotatable relative to the first handle 218 to translate the adjustment member 254 in an axial direction along the longitudinal axis 286 (FIGS. 8 and 9).

Figure 9:
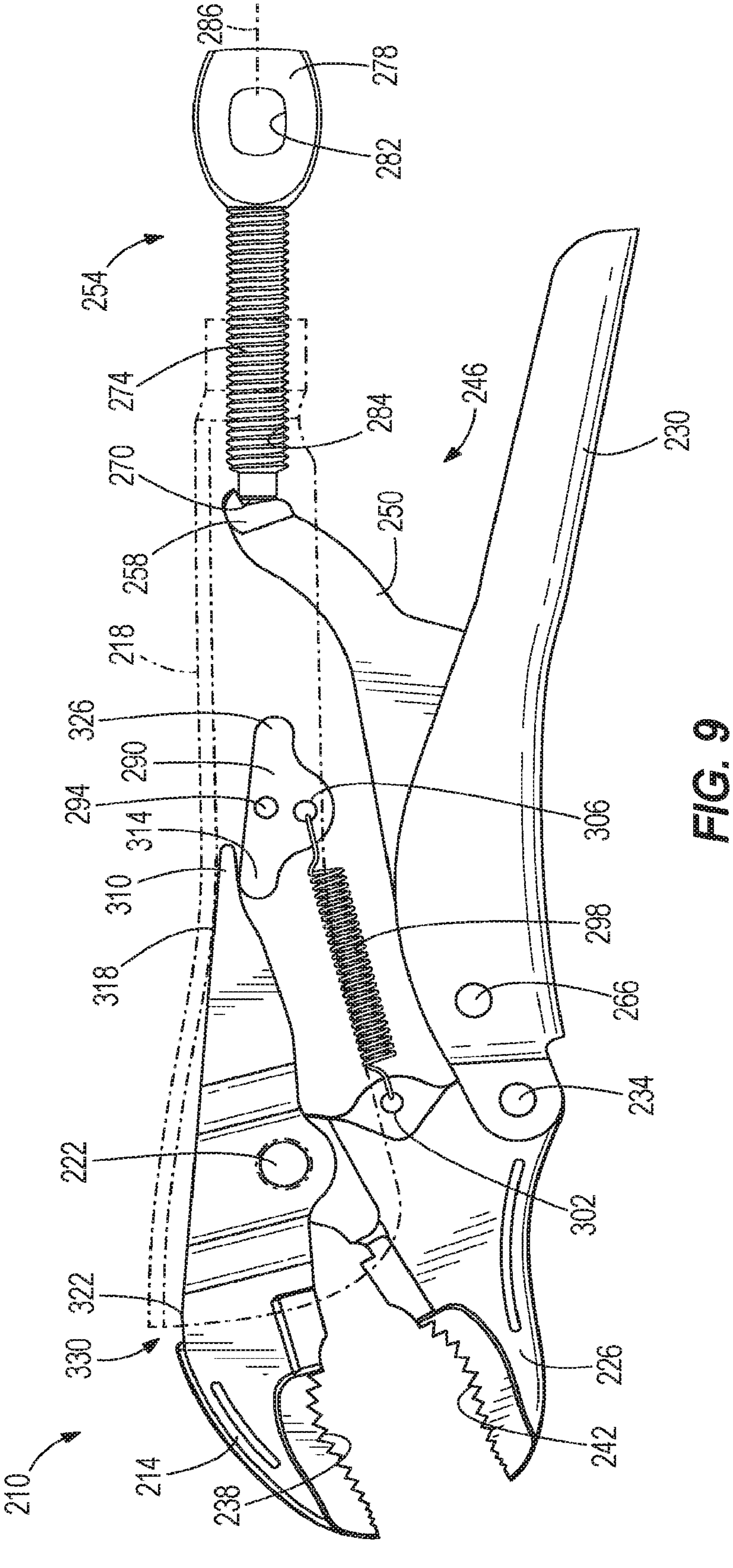
FIG. 9 is a side view of the locking pliers of FIG. 7, shown in a position with the lower handle closed and the jaws opened.

With continued reference to FIGS. 8 and 9, engagement between the engagement surface 270 and the first end 258 of the lock link member 250 causes the lock link member 250 to move with respect to the third pivot pin 266, adjusting the force the jaws 214, 226 exert on a workpiece when the pliers 210 is in the closed position. In other words, changing the position of the adjustment member 254 relative to the first handle 218 changes the distance between the first jaw 214 and the second jaw 226 when the second handle 230 is in a closed position. With reference to FIG. 8, the adjustment member 254 is in a first position, corresponding to the first jaw 214 and the second jaw 226 being closed together (i.e., jaw faces 238, 242 are touching). If the adjustment member 254 is rotated to extend from the first handle 218, as shown in FIG. 9, the second jaw 226 is now spaced from the first jaw 214.

In addition, the locking pliers 210 further include a moveable body member 290 pivotally coupled to the first handle 218 at a fourth pivot pin 294. The locking pliers 210 also includes a spring 298 coupled between the second jaw 226 and the moveable body member 290. More specifically, the spring 298 is coupled to an aperture 302 formed on the second jaw 226 at one end of the spring 298 and coupled to an aperture 306 formed on the moveable body member 290 at an opposite end of the spring 298. As explained in greater detail below, the spring 298 biases the second jaw 226 toward the first handle 218, along the longitudinal axis of the spring 298, and the spring 298 further biases the moveable body member 290 to rotate about the fourth pivot pin 294.

With continued reference to FIG. 8, the moveable body member 290 supports an end 310 of the first jaw 214. More specifically, a first protruding portion 314 of the moveable body member 290 raises the end 310 of the first jaw 214 as the moveable body member 290 is biased by the spring 298 to rotate clockwise about the fourth pivot pin 294 in the frame of reference of FIG. 8. Raising the end 310 of the first jaw 214 causes the first jaw 214 to rotate counter-clockwise about the first pivot pin 222 in the frame of reference of FIG. 8. Continued rotation of the first jaw 214 and the moveable body member 290 is limited by engagement between the jaw 214 and the first handle 218. In particular, a first engaging portion 318 of the first jaw 214 is abutted against the first handle 218 by the moveable body member 290, which is under the bias of the spring 298, to inhibit further rotation of the first jaw 214 and the moveable body member 290.

Figure 11:
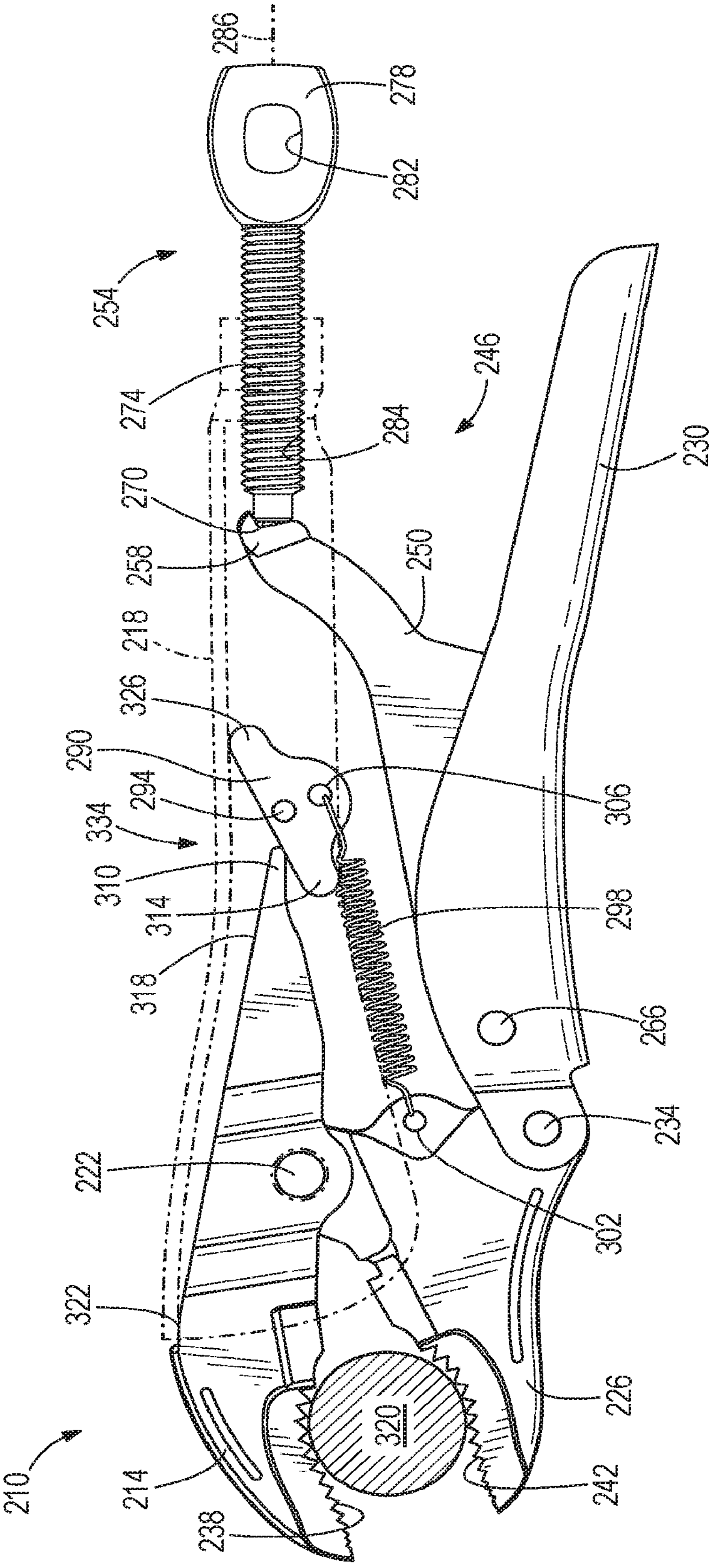
FIG. 11 is a side view of the locking pliers of FIG. 7, shown in a position with the lower handle closed and a workpiece positioned between the closed jaws, with the lower jaw in an energized configuration increasing the clamping force on the workpiece.

With reference to FIG. 11, as the jaws 214, 226 close around a workpiece 320, the first jaw 214 pivots with respect to the first handle 218 about the first pivot pin 222. When the first jaw 214 pivots, the end 310 of the first jaw 214 causes the moveable body member 290 to move with respect to the first handle 218. When the moveable body member 290 moves with respect to the first handle 218, the biasing force acting on the second jaw 226 by the spring 290 is adjusted. In other words, in the position shown in FIG. 11, the moveable body member 290 is biased by the first jaw 214 to rotate counter-clockwise about the fourth pivot pin 294 to increase the overall length of the spring 290, thereby increasing the overall biasing force applied to the second jaw 226 by the spring 290. With the moveable body member 290 rotated and the increased spring biasing force applied to the second jaw 226, the gripping force between the two jaws 214, 226 is increased. Continued rotation of the first jaw 214 and the moveable body 290 is limited by engagement with the first handle 218. In particular, a second engaging portion 322 of the first jaw 214 is abutted against the first handle 218, and a second protruding portion 326 of the moveable body 290 is abutted against the first handle 218 to inhibit further rotation of the first jaw 214 and the moveable body member 290. In particular, the second protruding portion 326 is opposite the first protruding portion 314, and the member 290 is configured to rotate about the fourth pivot pin 294, which is positioned between the first protruding portion 314 and the second protruding portion 326. In other embodiments, abutment against the first handle 218 to prevent further rotation may be accomplished with one of the first jaw 214 or the moveable body member 290. In the illustrated embodiment, the first engaging portion 318 is positioned behind (i.e., closer to the adjustment member 254) the first pivot pin 222, and the second engaging portion 322 is positioned ahead of (i.e., closer to the jaw face 238) the first pivot pin 222.

Figure 10:
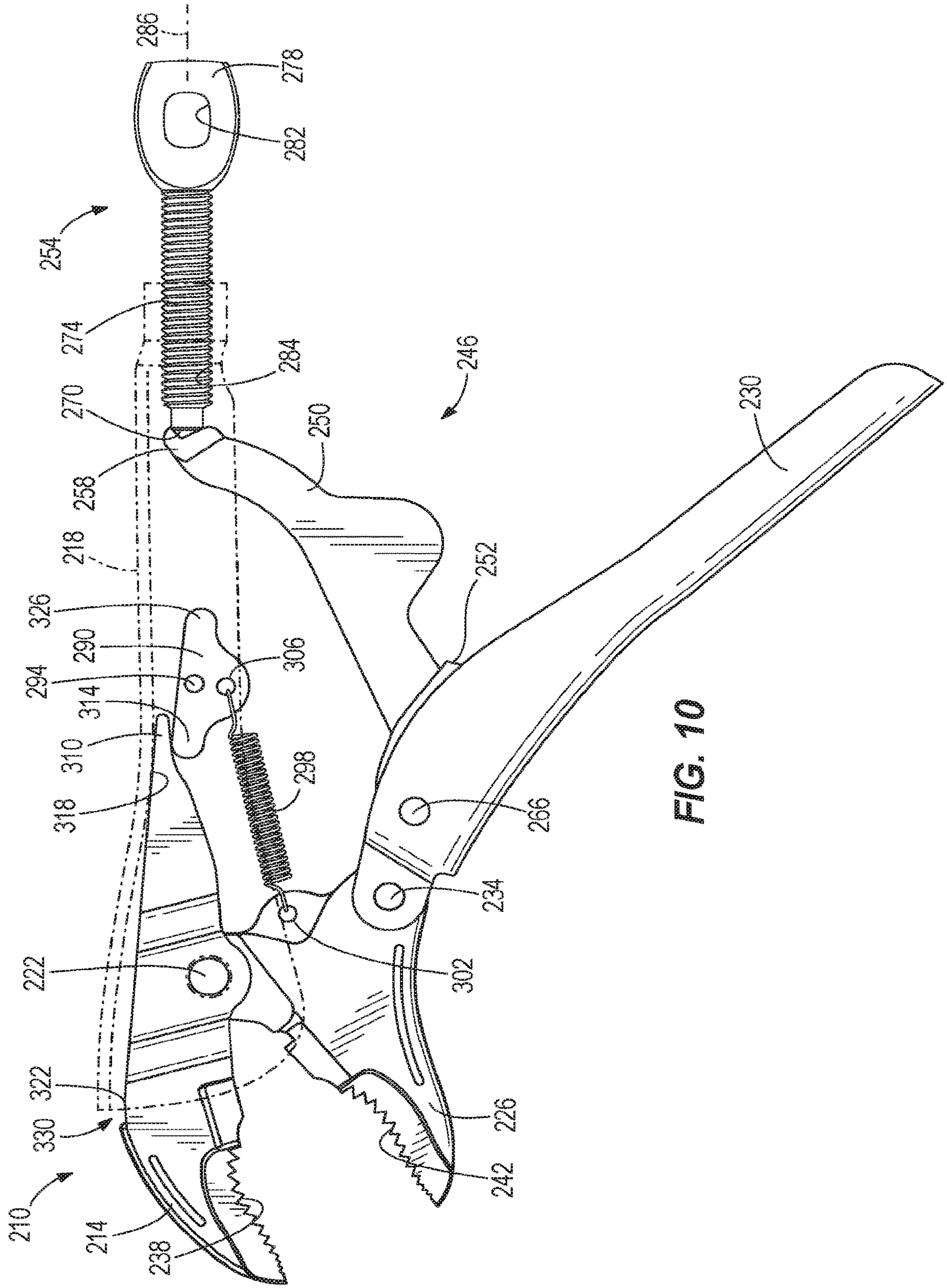
FIG. 10 is a side view of the locking pliers of FIG. 7, shown in a position with the lower handle opened and the jaws opened.

With reference to FIGS. 8-10, the first engaging portion 318 of the first jaw 214 is shown abutted against the first handle 218, with no gap or clearance therebetween. However, a front gap 330 is defined between the second engaging portion 322 of the first jaw 214 and the first handle 218. With reference to FIG. 11, the first engaging portion 318 of the first jaw 214 is shown spaced from the first handle 218, with a rear gap 334 defined between the first engaging portion 318 and the first handle 218. However, the front gap 330 of FIGS. 8-10 is now eliminated and the second engaging portion 322 of the first jaw 214 is now abutted against the first handle 218, with no gap or clearance therebetween. In other words, movement of the first jaw 214 is rotationally constrained by the first handle 218 in both of the clockwise direction and the counter-clockwise direction about the first pivot pin 222.

In operation, the locking pliers 210 begin with the first jaw 214 and the second jaw 218 in the closed position, and with the second handle 230 in a closed position, as shown in FIG. 8. As discussed above, in the position shown in FIG. 8, the moveable body member 290 forces the end 310 of the first jaw 214 into engagement with the first handle 218, creating a front gap 330 between the first jaw 214 and the first handle 218. As discussed above, a user may adjust the distance between the first jaw 214 and the second jaw 226 while the handles 218, 230 are closed by rotation of the adjustment member 254, as shown in FIG. 9. The second handle 230 is then opened with respect to the first handle 218, as shown in FIG. 10, to further increase the distance between the first jaw 214 and the second jaw 226. With the jaws 214, 226 in an open position, the user positions the jaws 214, 226 around the workpiece 320 and then pivots the second handle 230 about the second pivot pin 234 toward the first handle 218 to move the second jaw 226 toward the closed position (FIG. 11). The user may then grasp the flange 278 and rotate the adjustment member 253 relative to the first handle 218 to decrease the distance between the jaws 214,226 and thereby increase the clamping force when the jaws 214,226 contact the workpiece 320. When a high clamping force is desired, the user can insert an elongated member (e.g., a screwdriver) through the elongate opening 282 to assist in rotating the adjustment member 254 while the jaws 214, 226 remain clamped on the workpiece 320.

With reference to FIG. 11, when the jaws 214, 226 are secured around the workpiece 320, the workpiece 320 contacts the first jaw face 238 and forces the first jaw 214 to rotate about the first pivot pin 222 in a clockwise direction from the frame of reference of FIG. 11. As the first jaw 214 rotates, the end 310 contacts the first protruding portion 314 of the moveable body member 290 and causes the moveable body member 290 to rotate about the fourth pivot pin 294, against the bias of the spring 298. Rotation of the body member 290 in the counter-clockwise direction increases the overall length of the spring 298 and as a result, the biasing force applied to the second jaw 226 is increased. The increased biasing force applied to the second jaw 226 results in an increase in the clamping force on the workpiece 320 between the jaw faces 238, 242. In other words, the distance between the apertures 302, 306 supporting the spring 298 increases when the moveable body member 290 is rotated counter-clockwise by the first jaw 214. As such, the reaction force from the workpiece 320 causes the first jaw 214 to rotate and the second jaw 226 to become “energized”, increasing the amount of clamping force applied to the workpiece 320. As a result, the locking pliers 210 resist slipping on the workpiece 320 at higher applied torques.

With reference to FIGS. 18-23, a hand tool in the form of a locking pliers 610 is illustrated according to another embodiment of the invention. The locking pliers 610 include a moveable first jaw 614 and a first handle 618 pivotally coupled to the moveable first jaw 614 at a first pivot pin 622. In other words, the first jaw 614 is movable with respect to the first handle 618. The locking pliers 610 also includes a moveable second jaw 626 pivotally coupled to the first jaw 614 at a second pivot pin 624, and a second handle 630 pivotally coupled to the second jaw 626 at a third pivot pin 634. In the illustrated embodiment, the second pivot pin 624 is positioned between the first pivot pin 622 and the third pivot pin 634. As explained in greater detail below, the second pivot pin 624 and the third pivot pin 634 are operable to move with respect to the first pivot pin 622.

Figure 19:
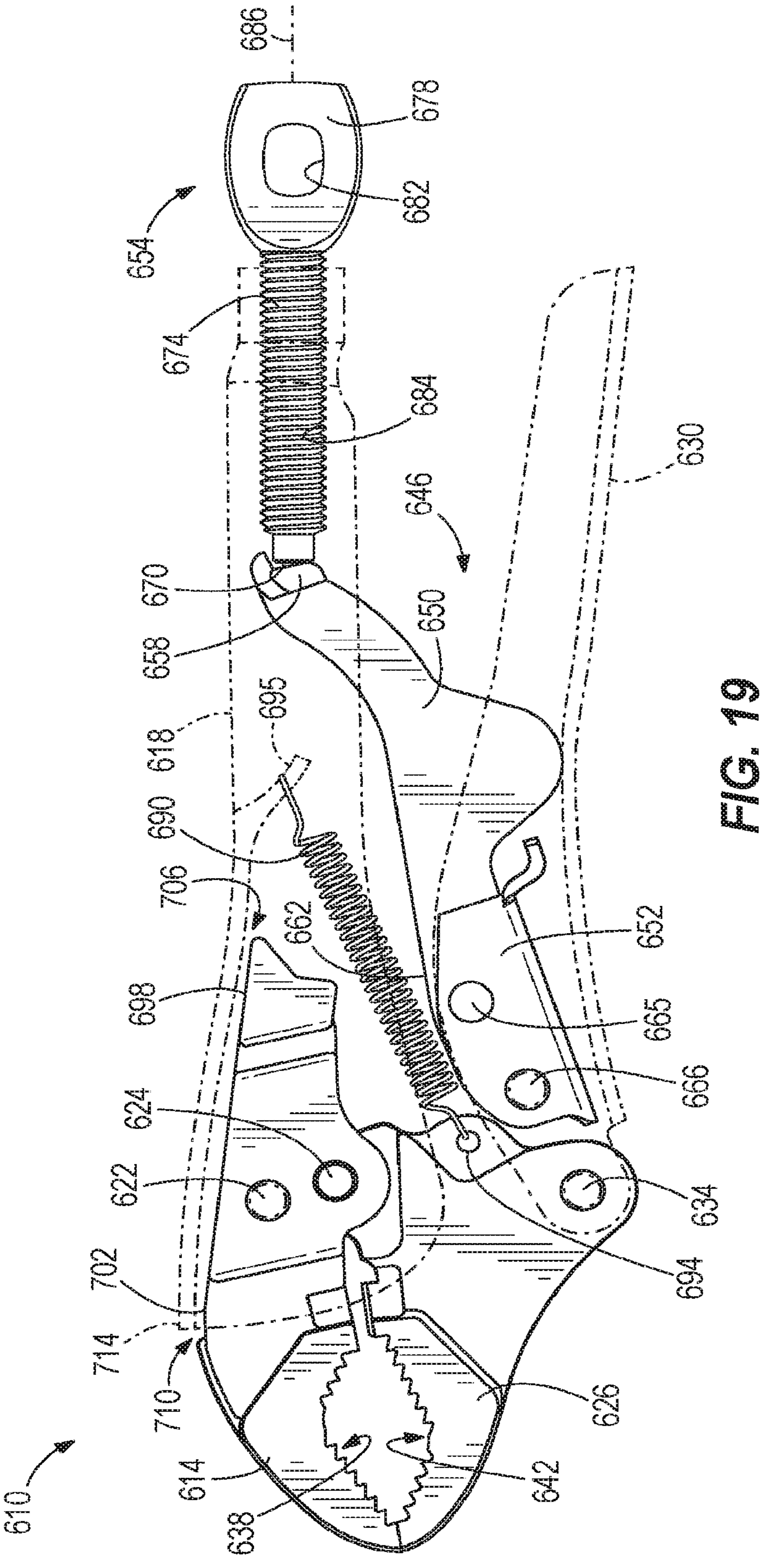
FIG. 19 is a side view of the locking pliers of FIG. 18, shown in a position with the lower handle closed and the jaws closed.
Figure 20:
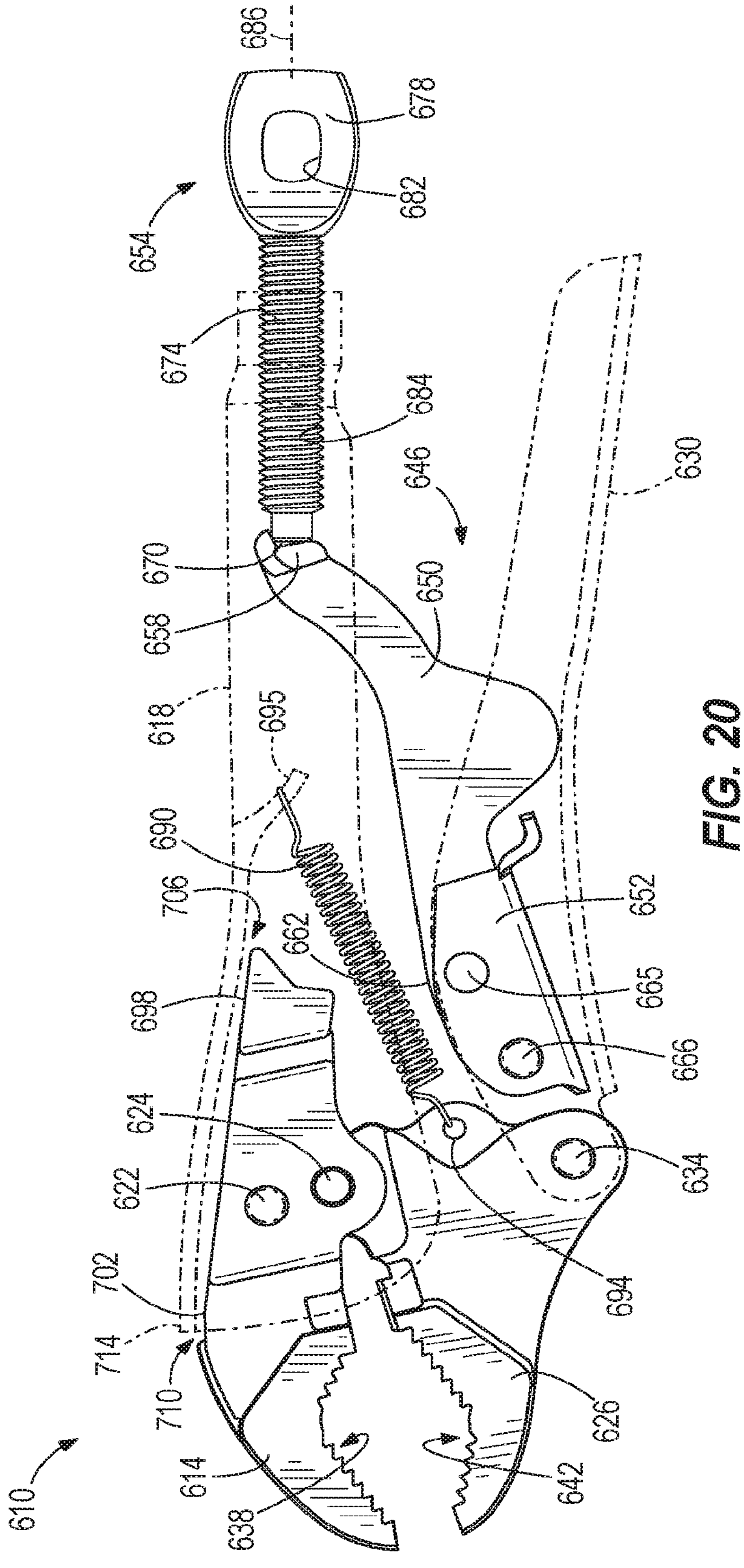
FIG. 20 is a side view of the locking pliers of FIG. 18, shown in a position with the lower handle closed and the jaws opened.

The second handle 630 pivots about the third pivot pin 634 to move the jaws 614, 626 between an open position (e.g., FIG. 21) and a closed position (e.g., FIGS. 19 and 20). In other words, the second handle 630 pivots with respect to the first handle 618 to increase or decrease a distance between the first jaw 614 and the second jaw 626. The illustrated jaws 614, 626 include V-shaped jaw faces 638, 642; however, in other embodiments, the jaw faces may be C-shaped clamping arms, curved jaw faces, or any type of jaw face. The jaws 614, 626 are made of chrome plated, forged alloy steel for high durability and corrosion resistance. In other embodiments, the jaws 614, 626 can be made of other materials.

With continued reference to FIG. 19, the locking pliers 610 further includes a locking mechanism 646 that is operable to retain the pliers 610 in the closed position. The locking mechanism 646 includes a lock link member 650, a compound toggle link 652, and an adjustment member 654 (a.k.a. a control key). A first end 658 of the lock link member 650 is slidably coupled to the first handle 618 and is axially moveable along the first handle 618. A second end 662 of the lock link member 650 is pivotally coupled to the toggle link 652 at a pivot pin 665, and the toggle link 652 is pivotally coupled to the second handle 630 at a fourth pivot pin 666. In some embodiments, lock link member 650 is directly pivotally coupled to the second handle 630 and the toggle link 652 is replaced with a release lever provided to release the pliers from the locked closed position. In other words, a release lever is at least partially positioned between the second handle and the lock member (e.g., release lever 453 of FIG. 12).

The adjustment member 654 includes an engagement surface 670 at one end, a threaded shank 674, and a flange 678 extending from the shank 674 opposite the engagement surface 670. In the illustrated embodiment, an elongate opening 682 is formed on the flange 678. The adjustment member 654 is integrally formed as a single component from metal such as by casting, forging, and the like. The threaded shank 674 defines a longitudinal axis 686 (i.e., an adjustment axis) and is received by a threaded bore 684 in an end of the first handle 618 opposite the first jaw 614. The adjustment member 654 is rotatable relative to the first handle 618 to translate the adjustment member 654 in an axial direction along the longitudinal axis 686 (FIGS. 19 and 20).

With continued reference to FIGS. 19 and 20, engagement between the engagement surface 670 and the first end 658 of the lock link member 650 causes the lock link member 650 to move with respect to the fourth pivot pin 666, adjusting the force the jaws 614, 626 exert on a workpiece when the pliers 610 is in the closed position. In other words, changing the position of the adjustment member 654 relative to the first handle 618 changes the distance between the first jaw 614 and the second jaw 626 when the second handle 630 is in a closed position. With reference to FIG. 19, the adjustment member 654 is in a first position, corresponding to the first jaw 614 and the second jaw 626 being closed together (i.e., jaw faces 638,642 are touching). If the adjustment member 654 is rotated to extend from the first handle 618, as shown in FIG. 20, the second jaw 626 is now spaced from the first jaw 614.

In addition, the locking pliers 610 further includes a spring 690 coupled between the second jaw 626 and the first handle 618. More specifically, the spring 690 is coupled to an aperture 694 formed on the second jaw 626 at one end of the spring 690 and coupled to a protrusion 695 formed on an underside of the first handle 618 at an opposite end of the spring 690. The spring 690 biases the second jaw 626 toward the first handle 618, along the longitudinal axis of the spring 690.

Figure 21:
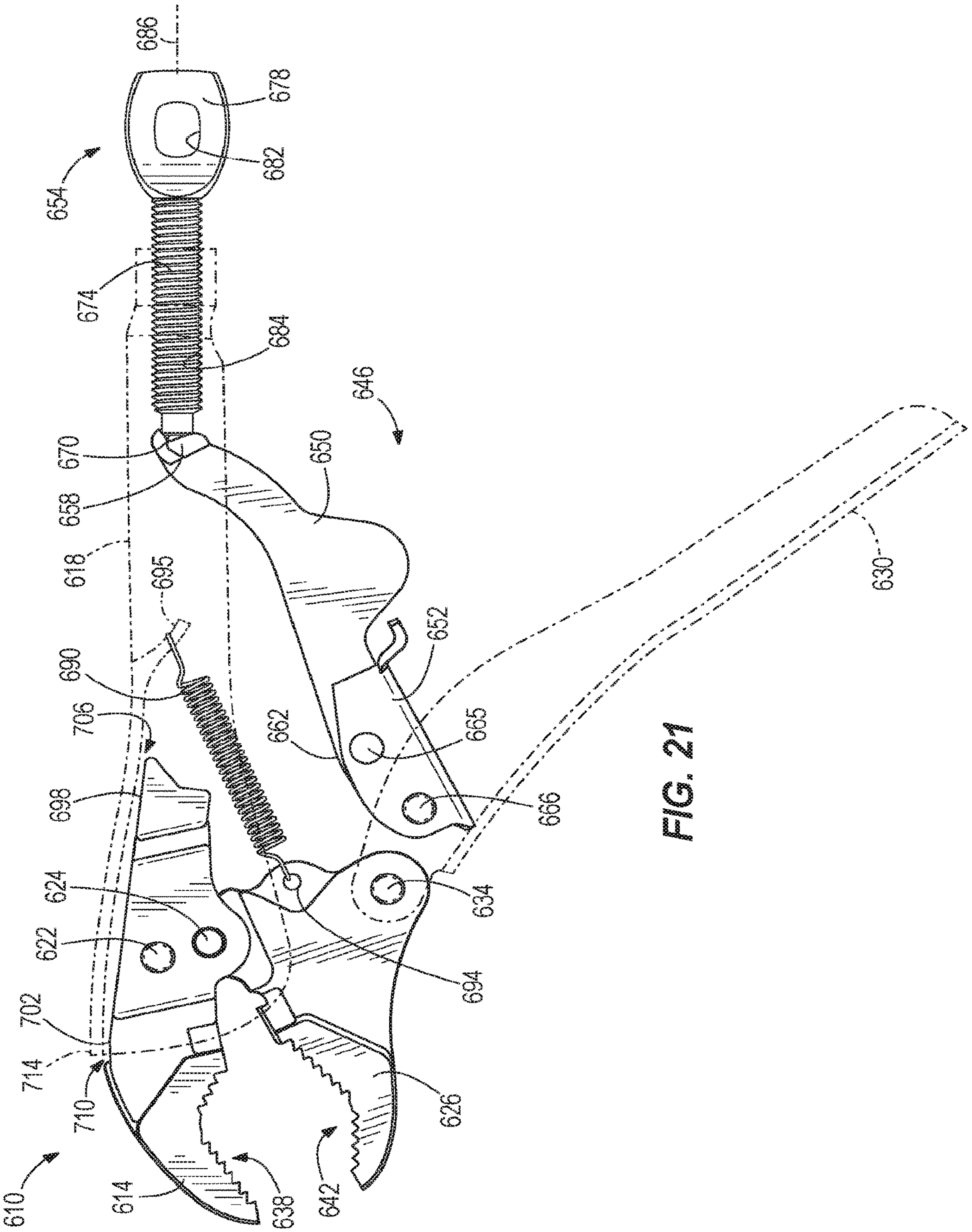
FIG. 21 is a side view of the locking pliers of FIG. 18, shown in a position with the lower handle opened and the jaws opened.

With continued reference to FIG. 19-21, the first jaw 614 includes a first engagement portion 698 and a second engagement portion 702, which are both engageable with the first handle 618. In particular, a rear gap 706 is defined between the first engagement portion 698 of the first jaw 614 and the first handle 618. In addition, a front gap 710 is defined between the second engagement portion 702 of the first jaw 614 and the first handle 618. In FIGS. 19-21, the first jaw 614 is shown in a neutral pivotal state with both the front gap 710 and the rear gap 706. However, with reference to FIG. 22, as the jaws 614,626 close around a workpiece 114, the first jaw 614 pivots with respect to the first handle 618 about the first pivot pin 622.

When the first jaw 614 pivots, one of the engaging portions 698, 702 moves towards the first handle 618, while the other one of the engagement portions 698, 702 moves away from the first handle 618. However, movement of the first jaw 614 is rotationally constrained by the first handle 618 in both of the clockwise direction and the counter-clockwise direction about the first pivot pin 622. In particular, continued rotation of the first jaw 614 is limited by engagement by either of the first or second engagement portions 698, 702 with the first handle 618. In other words, the front gap 710 or the rear gap 706 are eliminated to limit the rotation of the first jaw 614 with respect to the first handle 618. As shown in FIG. 21, the second engaging portion 702 of the first jaw 614 is abutted against a front portion 714 the first handle 618 to inhibit further rotation of the first jaw 214. In other words, the front gap 710 of FIG. 21 is now eliminated and the first engaging portion 698 of the first jaw 614 is now abutted against the first handle 618, with no gap or clearance therebetween. In the illustrated embodiment, the first engaging portion 698 is positioned behind (i.e., closer to the adjustment member 654) the first pivot pin 622, and the second engaging portion 702 is positioned ahead of (i.e., closer to the jaw face 638) the first pivot pin 622.

Figure 22:
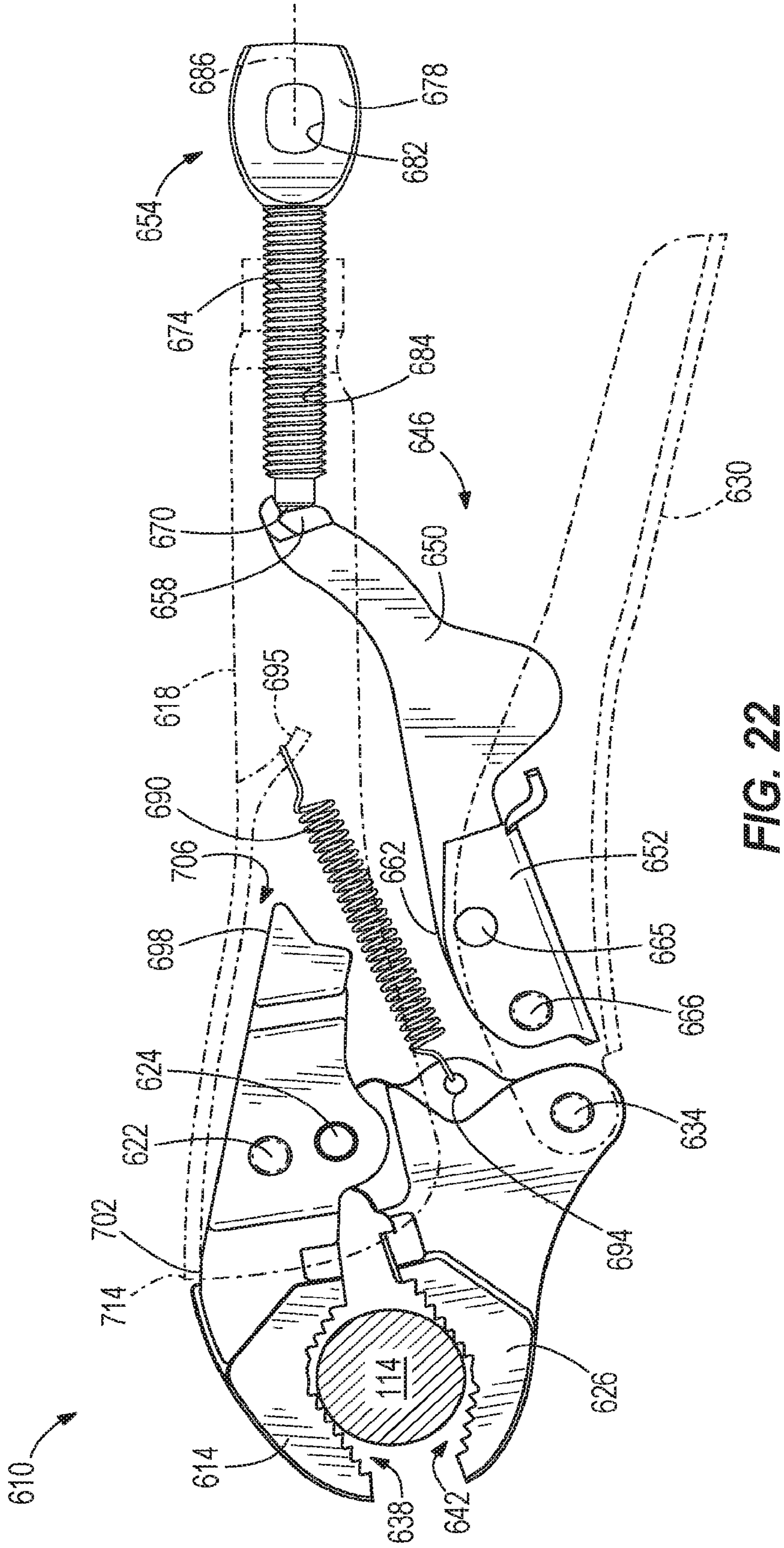
FIG. 22 is a side view of the locking pliers of FIG. 18, shown in a position with the lower handle closed and a workpiece positioned between the closed jaws.

In operation, the locking pliers 610 begin with the first jaw 614 and the second jaw 626 in a closed position, and with the second handle 630 in a closed position, as shown in FIG. 19. As discussed above, a user may adjust the distance between the first jaw 614 and the second jaw 626 while the handles 618,630 are closed by rotation of the adjustment member 654, as shown in FIG. 20. The second handle 630 is then opened with respect to the first handle 618, as shown in FIG. 21, to further increase the distance between the first jaw 614 and the second jaw 626. With the jaws 614, 626 in an open position, the user positions the jaws 614, 626 around the workpiece 114 and then pivots the second handle 630 about the third pivot pin 634 towards the first handle 618 to move the second jaw 626 toward the closed position (FIG. 22).

Figure 23:
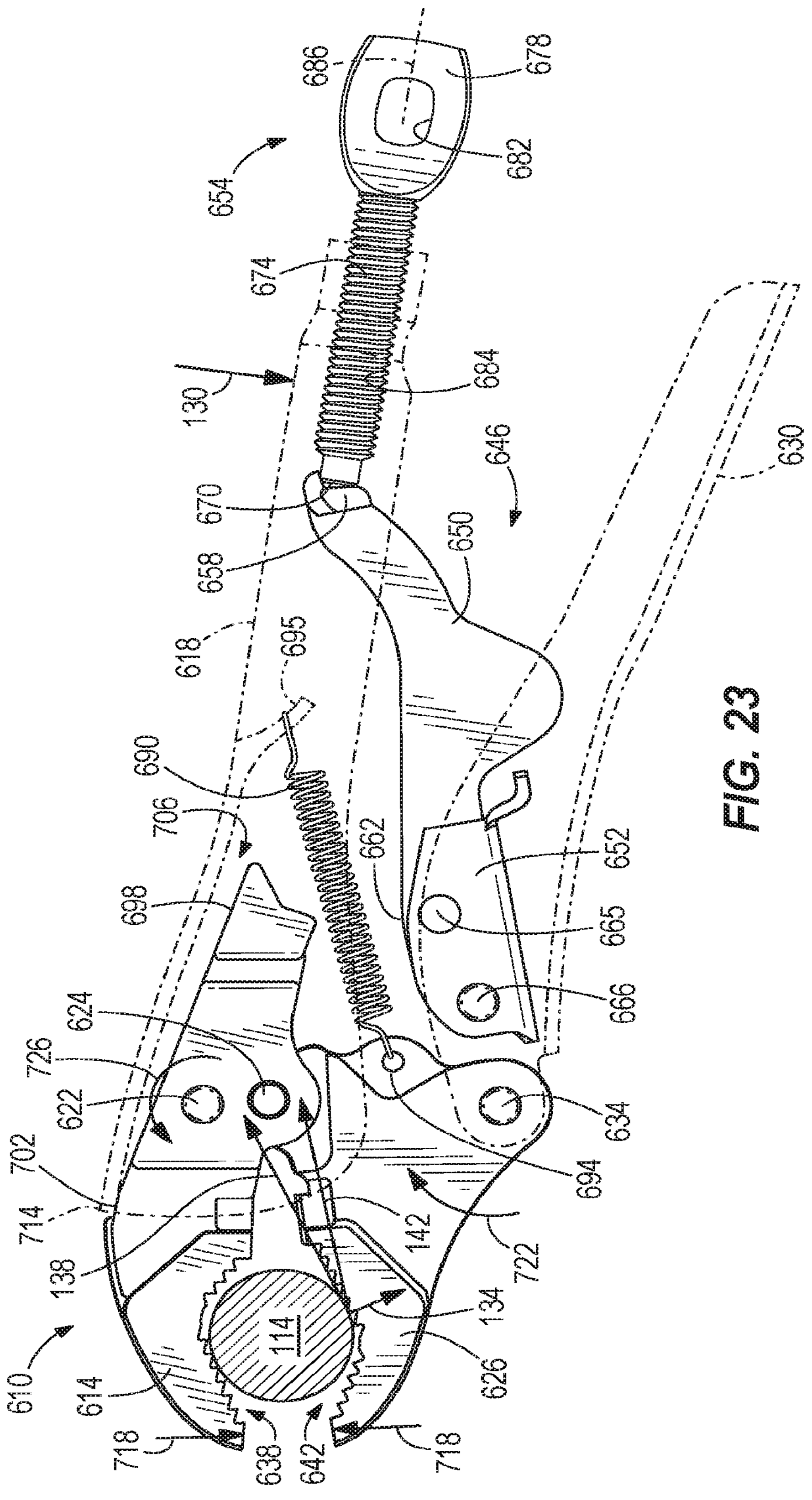
FIG. 23 is a side view of the locking pliers of FIG. 18, shown in a position with the lower handle closed and a workpiece positioned between the closed jaws, with the lower jaw in an energized configuration increasing the clamping force on the workpiece.

With reference to FIG. 23, when the jaws 614, 626 are secured around the workpiece 114 and an external force 130 is applied to the first handle 618 by a user, the second jaw 626 moves with respect to the first jaw 614 to increase a clamping force 718 acting on a workpiece 114 positioned between the first jaw 614 and the second jaw 626. More specifically, when the external force 130 is applied to the first handle 618, the force is transferred through the work-piece 114 to the second jaw 626 as a normal force 134 and a tangential force 138. The normal force 134 and the tangential force 138 combine to form an overall resultant reaction force 142 acting on the second jaw 626, which causes movement of the second pivot pin 624 towards the first handle 618. Movement of the second pivot pin 624 causes rotation of the second jaw 626 in a direction 722 about the third pivot pin 634, and causes rotation of the first jaw 614 in a direction 726 about the first pivot pin 622. In other words, when a user applies the force 130, the jaw faces 638, 642 are formed such that the reaction force 142 from the workpiece 114 on the second jaw 626 causes rotation of the first jaw 614 and the second jaw 626. Rotation of the first jaw 614 in the direction 726 and rotation of the second jaw 626 in the direction 722 shown in FIG. 23, results in the jaws 614, 626 (and more specifically the jaw faces 638, 642) moving closer together. As such, the application of the external force 130 causes the first and second jaws 614, 626 to become "energized" and to increase the amount of clamping force 718 applied to the workpiece 114.

In other words, when the jaws 614, 626 are closed and locked on the workpiece 114 and an external force 130 is applied to try and turn the workpiece 114 (FIG. 23), the second jaw 626 rotates backwards and upwards in the rotational direction 722 and the first jaw 614 rotates about the first pivot 622 in the rotational direction 726. As the moveable first and second jaws 614, 626 move in the directions 726, 722, respectively, the gripping force 718 exerted on the workpiece 114 is increased as the external force 130 applied to the locking pliers 610 increases. As a result, the locking pliers 610 resist slipping on the workpiece 114 at higher applied torques.

Various features and advantages of the invention are set forth in the following claims.

The invention claimed is:

1. A hand tool comprising:
- a first handle;
- a first jaw pivotally coupled to the first handle;
- a second jaw pivotally coupled to the first jaw; and
- a second handle pivotally coupled to the second jaw;
- a member coupled to the first handle, the member comprising:
  - a body including an upper edge that extends in a first direction; and
  - a first protruding portion that supports an end of the first jaw, the first protruding portion extending from the body in the first direction along the upper edge;
- wherein the first jaw is pivotally coupled to the first handle about a first pivot pin and the second jaw is pivotally coupled to the first jaw about the first pivot pin
- a second pivot pin coupled to the member;
- an aperture formed on the member below the second pivot pin; and
- a spring coupled between the second jaw and the aperture, thereby providing a biasing force acting on the second jaw;
- wherein pivoting the first jaw with respect to the first handle causes the member to move with respect to the first handle, thereby adjusting the biasing force acting on the second jaw.

2. The hand tool of claim 1, wherein a gap is defined between the first jaw and the first handle.

3. The hand tool of claim 2, wherein the gap is a front gap and the hand tool further includes a rear gap defined between the first jaw and the first handle.

4. The hand tool of claim 1, wherein the spring biases the second jaw toward the first handle along a longitudinal axis of the spring and wherein the spring further biases the member to rotate about an axis.

5. The hand tool of claim 1, further comprising a second protruding portion that engages the first handle, the second protruding portion extending from the upper edge of the body.

6. The hand tool of claim 5, wherein the second protruding portion extends in a second direction that is opposite the first direction.

7. The hand tool of claim 6, wherein the member rotates about a second pivot pin positioned between the first protruding portion and the second protruding portion.

8. The hand tool of claim 1, wherein an external force applied to the first handle by a user causes the second jaw to move with respect to the first jaw to increase a clamping force acting on a workpiece positioned between the first jaw and the second jaw.

9. The hand tool of claim 1, further comprising a spring coupled between the second jaw and the first handle.

10. The hand tool of claim 1, wherein the member rotates about the second pivot pin positioned along the upper edge of the member.

11. The hand tool of claim 1, wherein the second pivot pin is positioned between the upper edge of the body and the aperture.

12. The hand tool of claim 1, wherein the first protruding portion has a curved edge.

13. The hand tool of claim 12, wherein the curved edge of the first protruding portion is concave and faces the first pivot pin.

* * * * *